US010295660B1

(12) United States Patent
McMichael et al.

(10) Patent No.: US 10,295,660 B1
(45) Date of Patent: May 21, 2019

(54) ALIGNING OPTICAL COMPONENTS IN LIDAR SYSTEMS

(71) Applicant: Panosense, Inc., Menlo Park, CA (US)

(72) Inventors: Ryan McMichael, Mountain View, CA (US); Adam Berger, Mountain View, CA (US); Brian Pilnick, East Palo Alto, CA (US); Denis Nikitin, Campbell, CA (US); Brian Alexander Pesch, Menlo Park, CA (US)

(73) Assignee: Panosense Inc., Foster City, CA (US)

( * ) Notice: Subject to any disclaimer, the term of this patent is extended or adjusted under 35 U.S.C. 154(b) by 120 days.

(21) Appl. No.: 15/487,342

(22) Filed: Apr. 13, 2017

Related U.S. Application Data

(60) Provisional application No. 62/440,693, filed on Dec. 30, 2016.

(51) Int. Cl.
*G01S 7/497* (2006.01)
*G01S 17/10* (2006.01)

(52) U.S. Cl.
CPC .......... *G01S 7/4972* (2013.01); *G01S 17/102* (2013.01)

(58) Field of Classification Search
CPC ..... G01S 7/4972; G02B 27/62; G01B 11/272; G01J 2001/4247; G01R 31/2635
See application file for complete search history.

(56) References Cited

U.S. PATENT DOCUMENTS

| | | |
|---|---|---|
| 3,790,277 A | 2/1974 | Hogan |
| 4,154,529 A | 5/1979 | Dyott |
| 4,516,158 A | 5/1985 | Grainge et al. |
| 4,700,301 A | 10/1987 | Dyke |
| 4,709,195 A | 11/1987 | Hellekson et al. |

(Continued)

FOREIGN PATENT DOCUMENTS

| | | |
|---|---|---|
| EP | 2410358 A1 | 1/2012 |
| WO | WO03073123 A1 | 9/2003 |
| WO | WO2012172526 A1 | 12/2012 |

OTHER PUBLICATIONS

U.S. Appl. No. 14/462,075, filed Aug. 18, 2014, Pennecot et al., "Devices and Methods for a Rotating LIDAR Platform with a Shared Transmit/Receive Path," 55 pages.

(Continued)

*Primary Examiner* — Thanh Luu
(74) *Attorney, Agent, or Firm* — Lee & Hayes, P.C.

(57) ABSTRACT

Techniques are described for aligning optical components within a LIDAR assembly. The techniques may be performed to align the optical components during manufacturing or assembly of the LIDAR assembly. For example, a first optical element (e.g., one of a light source or light sensor) may be installed in the LIDAR assembly. An optimal alignment for a second optical element (e.g., the other of the light source or light sensor) may be determined and the second optical element may be installed at the optimal alignment. The optimal alignment for the second optical element may be determined based on detected signals, for example, which may correspond to an alignment resulting in a strongest return signal, highest quality return signal, and/or minimal interference. Additionally, or alternatively, techniques may be used to align optical components at runtime by using an actuator to move one or more components of the LIDAR assembly during operation.

20 Claims, 11 Drawing Sheets

(56) References Cited

U.S. PATENT DOCUMENTS

| | | | |
|---|---|---|---|
| 5,098,185 | A | 3/1992 | Watanabe et al. |
| 5,202,742 | A | 4/1993 | Frank et al. |
| 5,303,084 | A | 4/1994 | Pflibsen et al. |
| 5,337,189 | A | 8/1994 | Krawczyk et al. |
| 5,428,438 | A | 6/1995 | Komine |
| 5,703,351 | A | 12/1997 | Meyers |
| 6,046,800 | A | 4/2000 | Ohtomo et al. |
| 6,115,128 | A | 9/2000 | Vann |
| 6,778,732 | B1 | 8/2004 | Fermann |
| 7,089,114 | B1 | 8/2006 | Huang |
| 7,248,342 | B1 | 7/2007 | Degnan |
| 7,255,275 | B2 | 8/2007 | Gurevich et al. |
| 7,259,838 | B2 | 8/2007 | Carlhoff et al. |
| 7,311,000 | B2 | 12/2007 | Smith et al. |
| 7,361,948 | B2 | 4/2008 | Hirano et al. |
| 7,417,716 | B2 | 8/2008 | Nagasaka et al. |
| 7,544,945 | B2 | 6/2009 | Tan et al. |
| 7,969,558 | B2 | 6/2011 | Hall |
| 8,050,863 | B2 | 11/2011 | Trepagnier et al. |
| 8,477,290 | B2 | 7/2013 | Yamada |
| 8,675,181 | B2 | 3/2014 | Hall |
| 8,742,325 | B1 | 6/2014 | Droz et al. |
| 8,767,190 | B2 | 7/2014 | Hall |
| 8,836,922 | B1 | 9/2014 | Pennecot et al. |
| 9,086,273 | B1 | 7/2015 | Gruver et al. |
| 9,285,464 | B2 | 3/2016 | Pennecot et al. |
| 9,368,936 | B1 | 6/2016 | Lenius et al. |
| RE46,672 | E | 1/2018 | Hall |
| 2002/0140924 | A1 | 10/2002 | Wangler et al. |
| 2008/0231514 | A1* | 9/2008 | Matsuura ............ G01S 7/4817 342/453 |
| 2008/0316463 | A1 | 12/2008 | Okada et al. |
| 2010/0220141 | A1 | 9/2010 | Ozawa |
| 2010/0302528 | A1 | 12/2010 | Hall |
| 2011/0216304 | A1 | 9/2011 | Hall |
| 2011/0255070 | A1 | 10/2011 | Phillips et al. |
| 2015/0293228 | A1 | 10/2015 | Retterath et al. |
| 2016/0047901 | A1 | 2/2016 | Pacala et al. |
| 2016/0282453 | A1* | 9/2016 | Pennecot ............ G01S 7/4972 |

OTHER PUBLICATIONS

Efficient Power Conversion, Why GaN circuits make better Lidar, retrieved on Mar. 3, 2017 at <<http://epc-co.com/epc/DesignSupport/TrainingVideos/eGaNDemos/GaN-circuits-make-better-LiDAR.aspx>>2 pages.

Notice of Allowance from the U.S. Patent and Trademark Office for U.S. Appl. No. 14/462,075, dated Nov. 18, 2015, 8 pages.

Office Action from the U.S. Patent and Trademark Office for U.S. Appl. No. 14/462,075, dated Jun. 17, 2015, 14 pages.

PCT Search Report and Written Opinion dated Nov. 19, 2014 for PCT Application No. PCT/US2014/047864, 12 pages.

Rim et al., "The optical advantages of curved focal plane arrays," Optics Express, vol. 16, No. 7, Mar. 31, 2008, 1 page.

Xu et al., "A calibration method of the multi-channel imaging lidar," Proceedings SPIE 9080, Laser Radar Technology and Applications XIX; and Atmospheric Propagation XI, 90800V, Jun. 9, 2014, 2 pages.

* cited by examiner

ALIGNING OPTICAL COMPONENTS IN LIDAR SYSTEMS

RELATED APPLICATIONS

This application claims priority to U.S. Provisional Application No. 62/440,693, filed Dec. 30, 2016, which is incorporated herein by reference.

BACKGROUND

The term "LIDAR" refers to a technique for measuring distances to visible objects by emitting light and measuring properties of the reflections of the light. A LIDAR system has a light emitter and a light sensor. The light emitter may comprise a laser that directs highly focused light toward an object which then reflects the light back to the light sensor. The light sensor may comprise a photodetector such as a photomultiplier or avalanche photodiode (APD) that converts light intensity to a corresponding electrical signal. Optical components such as lenses may be used in the light transmission and reception paths to focus light, depending on the particular nature of the LIDAR system.

A LIDAR system has signal processing components that analyze reflected light signals to determine the distances to surfaces from which the emitted laser light has been reflected. For example, the system may measure the "flight time" of a light signal as it travels from the laser, to the surface, and back to the light sensor. A distance is then calculated based on the known speed of light. As a result, reflected light failing to directly strike the sensor may cause the corresponding electrical signal to be weak or even non-existent. Therefore, the functioning of a LIDAR system can be affected by even small deviations in the alignment of the optical components. This is because the emitted light may travel great distances before being reflected by the object back toward the light sensor such that relatively small angular deviations of the light path may significantly affect the light sensors ability to detect the reflected light.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

As discussed above, the functionality of a LIDAR system is limited, in part, by an ability to properly align certain optical components with respect to other optical components within the LIDAR system. Difficulties associated with properly aligning optical components stem in part from the minute size of the optical components. In some LIDAR systems, for example, each of a light emitting component and a light sensor component may be on the order of 0.25 mm or less in diameter whereas the light emitted by the light source may typically travel hundreds of meters before being received by the light sensor component. Accordingly, the precision with which the components of a LIDAR assembly must be aligned requires highly sophisticated manufacturing systems. Furthermore, it is often desirable to reduce the field-of-view of a LIDAR system's light sensor to reduce peripheral light from entering the system and resulting in erroneous readings. Therefore, even when deploying state of the art manufacturing systems, difficulties remain in optimally aligning the optical axis of the light emitter (e.g., a laser light source) with the optical axis of the light sensor such that the transmitted beam remains within the field of view of the light sensor. Furthermore, existing LIDAR manufacturing processes involve simultaneously manipulating both light emitters and detectors to align the components, which is a time consuming and complicated process.

Accordingly, this disclosure is generally directed to systems and methods for aligning the optical components and/or optical axis thereof within LIDAR assemblies and other similar systems in which alignment between light emitters and light sensors impacts system functionality. In some contexts, alignment may include both angular alignment between emitters and sensors and/or alignment of physical locations of various components. In various examples, the systems and methods described herein may be used to (i) assist with affixing a laser light source to a LIDAR assembly into which a light sensor has been installed, (ii) assist with aligning light sensors within a LIDAR assembly into which a laser has been installed, and/or (iii) use actuators to dynamically align or re-align optical components that are already installed into a LIDAR assembly at runtime.

The techniques and systems described herein may be implemented in a number of ways. Several non-limiting examples are provided below with reference to the following figures. Furthermore, various features described with respect to some examples of the present application may be practiced in conjunction with other examples of the present application. For example, in some implementations, one or both of systems 200 or 400 may be used to install various components into one or more of systems 800, 900, and/or 1000.

Figure 1:
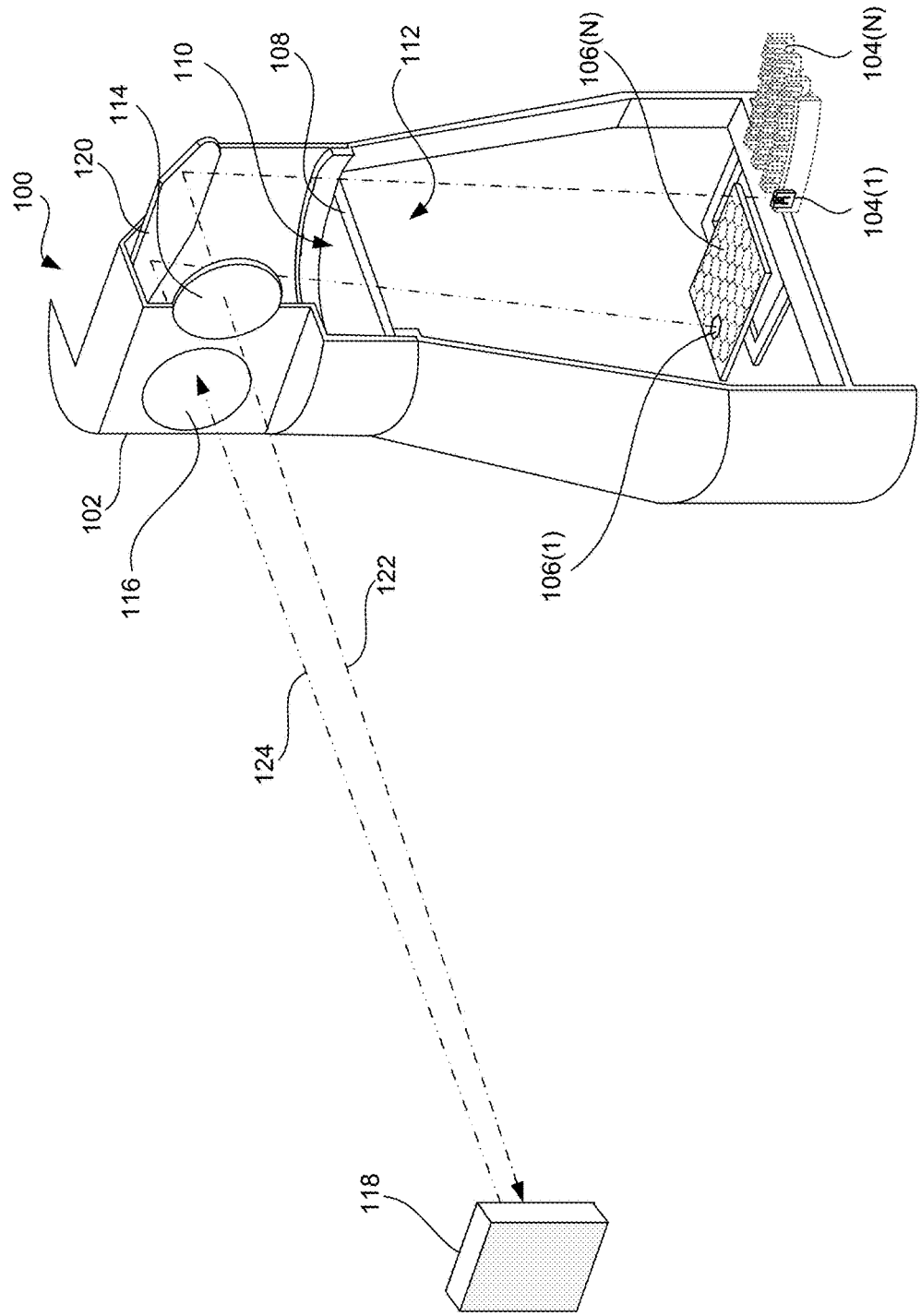
FIG. 1 illustrates an example configuration of a LIDAR assembly that includes optical components which may be aligned using the systems and methods described herein.

In some examples, the systems and methods described herein may be used to assist with affixing a laser light source to a LIDAR assembly into which a light sensor has been installed. Such examples may include a fixture to support the LIDAR assembly and a manipulator such as, for example, a robot arm to insert a laser into the LIDAR assembly and to align the laser with respect to the already installed light sensor. The laser may emit pulses of light while the manipulator moves the laser through a sequence of alignments. The system may monitor detected light signals that are produced by the light sensor in response to the pulses of light being reflected back toward, and ultimately into, the LIDAR assembly and striking the light sensor. An alignment for the laser may be determined based on the detected light signals. In some examples, an alignment which resulted in the strongest signals (e.g., corresponding to a highest intensity of light), highest quality signals (e.g., corresponding to a position or alignment of least parallax), and/or that minimizes interferences (e.g., has a highest signal-to-noise ratio) and/or cross-talk between channels may be used. The alignment that maximizes return signal strength may or may not be the same alignment that maximizes quality (e.g., minimizes parallax), or that minimizes interference. In some examples, the alignment may optimize any one or a combination of return signal strength, quality, and/or inference. Then, the robot arm may maintain the laser in the determined alignment while the laser is coupled to the LIDAR assembly. For example, an adhesive may be applied directly to the laser and/or to a laser support structure within the LIDAR assembly and the robot may optimally align the laser while the adhesive cures thereby securing the laser within the LIDAR assembly. In some examples, the laser support structure may include a printed circuit board that is mounted with a housing, such as a housing 102 of FIG. 1. As used herein, the term "housing" includes any structural element onto which multiple elements of the LIDAR system may be coupled. As illustrated in FIG. 1, lasers 104 may be mounted along upper edges of the laser support structure. In some examples, a series of laser support structures and the upper edges thereof are configured to position the lasers 104 along an imaginary sphere, so that all the lasers 104(1)-104(N) are optically equidistant from a focal point of a lens, such as a first lens 114 of FIG. 1. More specifically, each upper edge has a concave curve with a radius equal to the optical distance between the lasers 104 and the focal point of the first lens 114. In some examples, the laser support structures are inclined inwardly with respect to each other in order to direct the lasers 104(1)-104(N) toward the lens focal point. In other examples, the LIDAR assembly may employ a flat focal plane, in which case, one or more lasers may be disposed in a substantially planar configuration.

In some examples, the systems and methods described herein may be used to assist with aligning light sensors within a LIDAR assembly into which a laser has been installed. Such examples may include a fixture to support the LIDAR assembly and a temporary light sensor which may be temporarily installed into the LIDAR assembly to identify where a corresponding light sensor should be placed and aligned. The already installed laser may emit pulses of light while the temporary light sensor produces detected light signals indicating a region of the temporary light sensor having received reflected pulses of light. An optimal location for permanently installing a permanent light sensor into the LIDAR assembly may be determined based on the region of the temporary sensor hit most optimally (e.g., with the greatest radiant intensity) with the reflected pulses of light. Once determined, the manipulator may assist with installing the permanent light sensor onto a sensor board at the optimal location.

In some examples, the systems and methods described herein may use actuators to dynamically align or re-align optical components that are already installed into a LIDAR assembly at runtime. For example, a LIDAR system may include an actuator coupled to one or more components of a light emitter assembly, e.g., a laser light source, one or more lenses such as a collimator lens, and/or a light sensor. In some examples, an actuator may be used to physically adjust an optical axis of the light emitter assembly. For example, an actuator may shift a lens disposed in front of a laser to change a direction of a laser beam. Additionally or alternatively, an actuator may be used to physically adjust one or more components of a light receiving assembly. For example, an actuator may tilt a concave lens disposed in front of a light sensor to redirect light that would otherwise partially or entirely miss the light sensor. Further, an actuator may tilt, displace, or otherwise actuate at least a portion of a light sensor to dynamically align or re-align components at runtime. The actuator may allow for translation and/or rotation of the optical element. For example, the actuator may allow for rotation of the optical element about one or more axes, e.g., a roll, pitch, and/or yaw, to steer or point the optical element. Additionally, or alternatively, the actuator may, in some examples, enable translation of the optical element in one or more dimensions (e.g., one, two, or three dimensions) in order to further optimize alignment of the optical elements.

FIG. 1 illustrates an example configuration of a LIDAR assembly 100 that includes optical components which may be aligned using the systems and methods described herein. The LIDAR assembly 100 comprises a housing 102 which may support one or more of the optical components. Exemplary optical components may include laser light sources 104(1)-104(N) (also referred to collectively as laser light sources 104), light sensors 106(1)-106(N) (also referred to collectively as light sensors 106), one or more mirrors 120, and/or various lenses such as those described herein. In some examples, the housing 102 may include a partition 108 (shown as transparent for ease and clarity of installation) that forms a compartment on each of two lateral sides of the housing 102. In FIG. 1, a sensor compartment 110 is shown on one side of the housing 102 whereas an emitter compartment 112 is shown on the other side of the housing 102. The sensor compartment 110 houses the light sensor(s) 106 and the emitter compartment houses the laser light source(s) 104 while the partition 108 may be opaque to prevent light leakage there between.

In some examples, the housing 102 may also support a first lens 114 and a second lens 116 which may each be mounted so that their optical axes may be generally directed toward an object 118. The first lens 114 is generally above the emitter compartment 112 and forward of the laser light source(s) 104. In some examples, one or more mirrors 120 are positioned within the housing 102 behind the lenses 114 and 116 to redirect emitted and received light between horizontal and vertical directions. The laser light source 104 emits pulses of laser light 122 in an upward direction toward a mirror (e.g., the one or more mirrors 120) that redirects the pulses of light 122 along the optical axis of the first lens 114 to cause the one or more pulses of light to propagate toward the object 118. Upon hitting the object 118, the pulses of light 122 (shown in a dashed single dot line pattern) are reflected back to the LIDAR assembly 100 as reflected pulses of light 124 (shown in a dashed double dot line pattern) which pass through the second lens 116 before hitting the one or more mirrors 120 which redirect the reflected pulses of light 124 toward the light sensor(s) 106.

In some examples, the LIDAR assembly 100 may include a plurality of channels by which a laser light source 104 may emit light along a direction and the receiver may be aligned to the same direction so that the reflected light strikes a light sensor that corresponds specifically to the laser light source 104. For example, each of laser light source 104(1) and light sensor 106(1) may correspond specifically to a first channel whereas each of laser light source 104(N) and light sensor 106(N) may correspond specifically to an N-th channel. Accordingly, a distance to the object 118 may be calculated based on an observed time between emitting light from the laser light source 104(1) and receiving corresponding reflected light at the light sensor 106(1).

Figure 2:
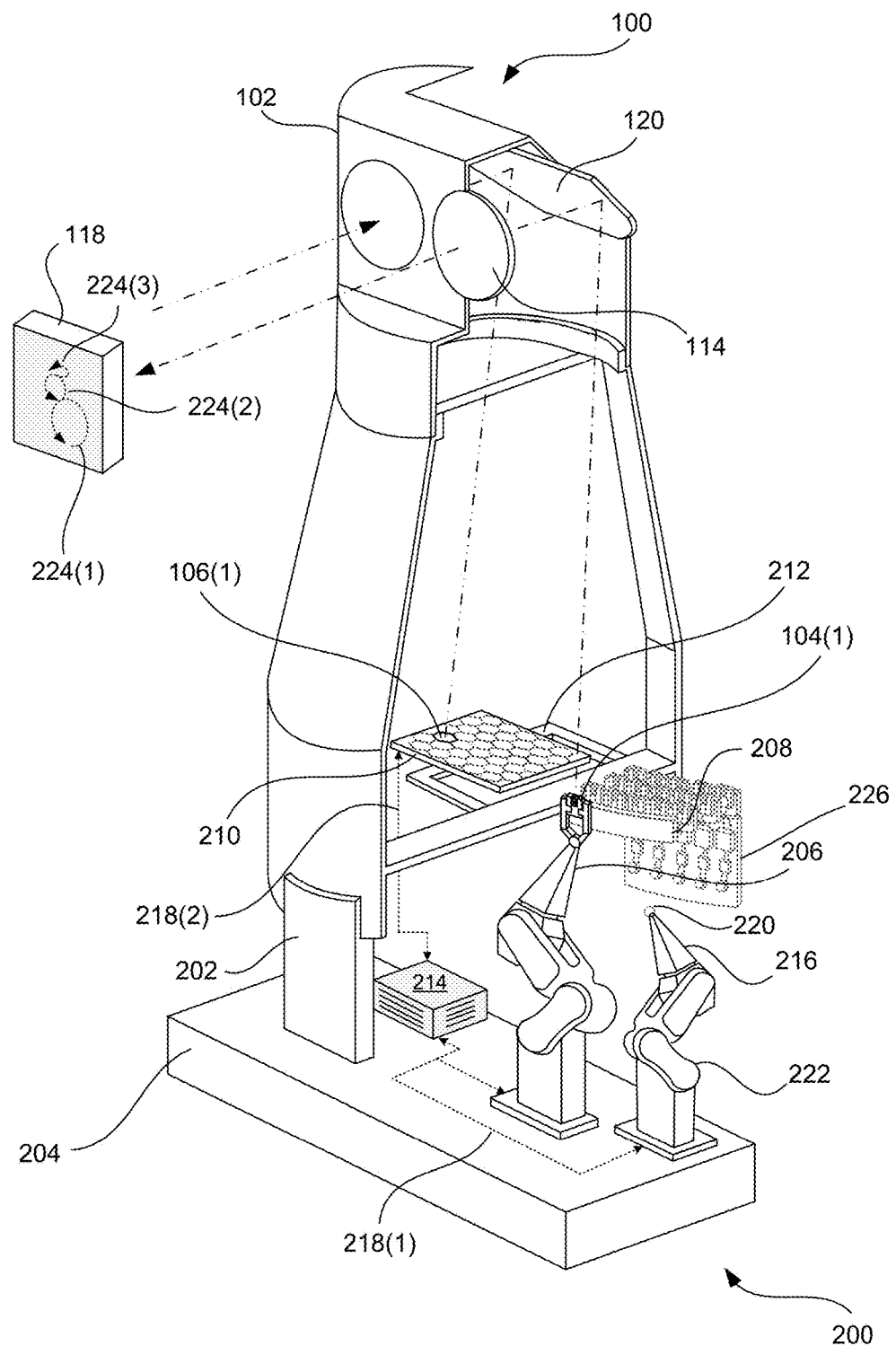
FIG. 2 illustrates an example system for determining an optimal alignment of an uninstalled optical component within a LIDAR assembly with respect to an installed optical component of the LIDAR assembly.

FIG. 2 illustrates an exemplary system 200 for determining an optimal alignment of an uninstalled optical component within a LIDAR assembly 100 with respect to an installed optical component of the LIDAR assembly 100. For example, the system 200 may be used to determine an optimal alignment of the laser light source 104(1) with respect to the light sensor 106(1) and to assist in coupling the laser light source 104(1) to the LIDAR assembly 100 at the optimal alignment. The system 200 may include a fixture 202 to support the LIDAR assembly 100 with respect to the object 118 such as a car or a wall or any other object that includes a visible surface for reflecting pulses of light back to the LIDAR assembly 100. For example, a fixture 202 may include a clamp to hold the housing 102 above a base 204 that supports a robot arm 206 to provide accessibility for the robot arm 206 to reach into the emitter compartment 112 while gripping the laser light source 104(1). The LIDAR assembly 100 may include a laser support structure 208 that is fixed with respect to the light sensor 106(1). For example, the light sensor 106(1) may be coupled to or integrated into a sensor board 210 that is affixed to the housing 102 via a sensor support arm 212.

The system 200 may also include a control unit 214 communicatively coupled to one or more of the robot arm 206, the sensor board 210, and/or an adhesive dispenser 216 via various communications channels 218. The control unit 214 may include one or more processor(s) and computer readable storage media storing instructions for performing various operations described herein. For example, the control unit 214 may be used to perform operations described with relation to systems 200 and/or 400, and/or processes 500, 600, and/or 700.

In some examples, the control unit 214 may cause the robot arm 206 to move and orient the laser light source 104(1) adjacent to the laser support structure 208 to enable light pulses to be emitted by the laser light source 104(1) out of the LIDAR assembly 100 and ultimately to hit the object 118. For example, the robot arm 206 may orient the laser light source 104(1) so that pulses of light (shown in a dashed single dot line pattern) are directed toward the mirror 120 and through the first lens 114 toward the object 118 which reflects the pulses of light back toward the LIDAR assembly 100 as reflected pulses of light (shown in a dashed double dot line pattern). Upon being struck by the reflected pulses of light, the light sensor 106(1) may produce signals proportional to the intensity of the reflected pulses of light as experienced by the light sensor 106(1), e.g., in terms of radiant intensity. For example, if no amount of the reflected pulses of light strike the light sensor 106(1) due to the laser light source 104(1) being poorly aligned, then the detected light signals may return a null reading to the control unit 214 along the communication channel 218(2). Based on the detected light signals, the control unit 214 may determine a quality and/or quantity of the detected light signals such as, for example, an amplitude of the detected light signals that corresponds to an intensity of the reflected pulses of light striking the sensor 106(1). An optimal alignment for the laser light source 104(1) may be determined based on the quality and/or quantity of the detected light signal. For example, in some implementations in which the optical alignment corresponds to maximizing the amplitude of the detected light signals, the control unit 214 may designate the optimal alignment as that which results in the highest intensity of the reflected pulses of light at the light sensor 106(1).

In some examples, the control unit 214 may determine the optimal alignment by monitoring the quality and/or quantity of the detected light signals that are produced when the laser light source 104(1) pulses light at various alignments. For example, the control unit 214 may be communicatively coupled with the light sensor 106(1), e.g., via a ribbon connector on the sensor board 210, to monitor signals produced based on the light intensity of the reflected pulses of light. The control unit 214 may also be communicatively coupled with the robot arm 206 to cause the robot arm 206 to move the laser light source 104(1) through numerous different alignments with respect to the light sensor 106(1). In some examples, the control unit 214 may cause the robot arm 206 to move the laser into a predetermined number of alignments, e.g., 50 or 100 alignments, and monitor corresponding signals produced by the light sensor 106(1) so a particular one of the alignments having optimal signal production (e.g., strongest signals and/or best signal-to-noise ratio) can be designated as the optimal alignment. In some examples, the control unit 214 may perform a signal optimization search pattern in order to determine successive alignments to check a signal quality for associated with the channel currently being examined. Any known search pattern may be used. In some examples, the robot arm 206 may move the laser light source 104(1) in a five degree of freedom space (e.g., three Cartesian dimensions, and two rotations). In some examples, the search pattern may comprise incrementally moving the laser light sources 104(1) in one or more of a x, y, z, roll, pitch, or yaw direction. For example, the control unit 214 may cause the robot arm 206 to move the laser light source 104(1) so that the pulses of light strike the object 118 forming a circular or polygonal pattern. Then, an alignment which resulted in the best detected light signal quality can be used as a starting point to repeat the performed pattern on a smaller scale. For example, the robot arm 206 may move the pulses of light through a first circular pattern 224(1) on the object 118 to determine an alignment of best signal quality for the first circular pattern 224(1). Then, the robot arm 206 may move the pulses of light through a second circular pattern 224(2) on the object 118 to determine an alignment of best signal quality for the second circular pattern 224(2). Such a search optimization pattern can be repeated for a third circular pattern 224(3) and so forth until the quality of the signal quality ceases to improve or until it reaches a predetermined signal quality. Although described in the context of a circular search pattern, any search pattern may be used, for example, a rectangular search pattern, a grid-based search pattern, a raster-type search pattern, etc. Such a search pattern may include incremental steps in one or more of an x direction, a y direction, a z direction, a roll direction, a pitch direction, or a yaw direction.

In some examples, once the optimal alignment is determined, the control unit 214 may cause the robot arm 206 to maintain the laser 104(1) in the optimal alignment for a period of time during which the laser light source 104(1) is coupled to the LIDAR assembly 100. For example, in some implementations, upon determining the optimal location, the control unit 214 may cause the robot arm 206 to remove the laser light source 104(1) from the emitter compartment 112 and expose a portion of the laser light source 104(1) so that an adhesive can be automatically applied to the portion of the laser. For example, a human operator or movable adhesive dispenser may then deposit an amount of an adhesive onto the portion of the laser light source 104(1) and provide an indication to the system 200 that this step has been completed. While not shown in this figure, a movable adhesive dispenser may be coupled to the robot arm 206 or another robot arm or manipulator to dispense adhesive. For example, the system 200 may prompt the human operator or movable adhesive dispenser to deposit the glue and indicate when this is complete. In some examples, the robot arm 206 may expose a portion of the laser light source 104(1) to the adhesive dispenser 216 which may then dispense adhesive 220 onto the laser light source 104(1). The adhesive dispenser 216 may be fixed in position or may be mounted to a second robot arm 222. In some examples, the second robot arm 222 may be caused to insert the adhesive dispenser 216 into the emitter compartment 112 and deposit adhesive directly onto the laser support structure 208. In some examples, the adhesive 220 may be deposited onto the laser support structure 208 and/or the laser light emitter 104(1) prior to determining the optimal alignment. For example, in an implementation in which the optimal alignment can reliably be determined within a period in which the adhesive 220 remains workable, it may be unnecessary to determine the optimal alignment prior to depositing the adhesive 220. In some examples, the adhesive 220 may be cured using applied heat, ultraviolet light, etc.

In some examples, the robot arm 206 may maintain the laser light source 104(1) adjacent to the laser support structure 208 and in the optimal alignment for the duration of a cure period corresponding to the adhesive 220, which in some instances may correspond to an amount of time required for the adhesive 220 to adequately set up. In some examples, the controller 214 may cause the laser light source 104(1) to continually, periodically, intermittently, or repeatedly emit additional pulses of light during and/or after the cure period to verify the quality of the detected light signals during and/or after the adhesive cure period and, if necessary, make any desirable fine tune adjustments.

Figure 3B:
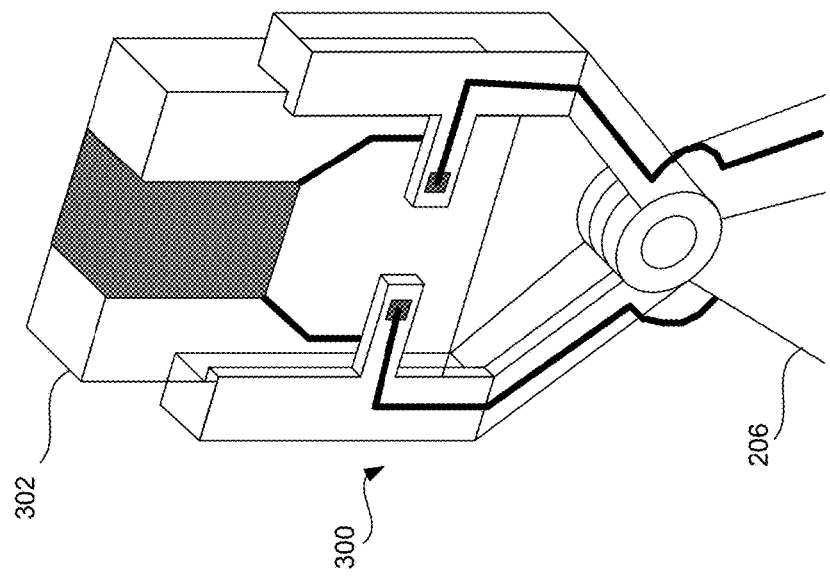
FIGS. 3A and 3B illustrate an example robot grip at a distal end of a robot arm in an open position and closed position, respectively. The robot grip may be configured to allow current to pass from a laser driver to a laser light source being griped.
Figure 3A:
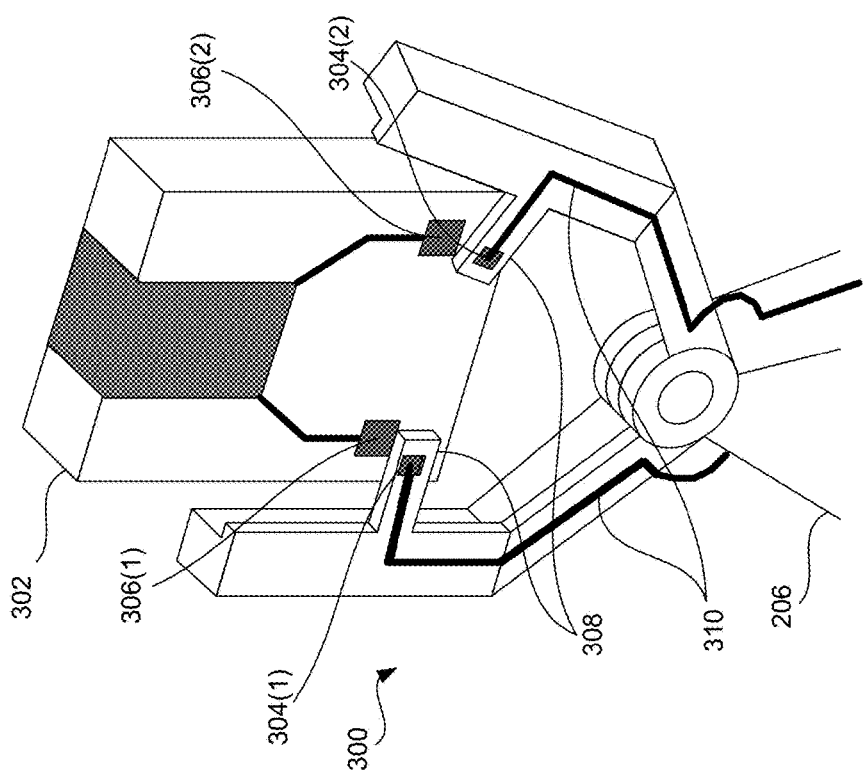

FIGS. 3A-3B illustrate an exemplary robot grip 300 at a distal end of a robot arm 206. In FIG. 3A the robot grip 300 is shown in an open position, whereas in FIG. 3B the robot grip 300 is shown in a closed position. The robot grip 300 may be specifically configured, e.g., in terms of size and/or potential gripping force, to hold a laser light source such a laser diode 302. In some examples, the robot grip 300 may include electrical contacts 304(1) and 304(2) (also collectively referred to as contacts 304) that are configured to pass current into contacts 306(1) and 306(2) (also collectively referred to as contacts 306) of the laser light source (e.g., the laser diode 302). For example, the robot grip 300 may include protrusions 308 which support or have embedded therein wires 310 leading to a laser driver. The contacts 304 may pass through the protrusions 308 and may be positioned to physically touch contacts 306 when the laser diode 302 is gripped down on by the robot grip 300. For example, in FIG. 3B the contacts 304 and contacts 306 are illustrated as being in physical contact so that current may pass between a laser driver, e.g., a laser driver of the control unit 214 or a laser driver that is coupled to the robot arm 206, and the laser diode 302. In some examples, the system 200 may include a laser driver configured to cause the laser to emit a continuous beam of light. In some examples, the system 200 may include a laser driver that is configured to cause the laser to emit intermittent or temporally spaced pulses of light.

Following the alignment operations and application of adhesive as discussed herein, the controller 214 may instruct the robot arm 206 (and/or the robot grip 300) to release the laser diode 302. Further, the contacts 306 can be permanently connected to a laser driver of the LIDAR assembly 100. For example, in some implementations, one or more laser drivers may be installed below the laser light sources after the laser light sources are installed. Following the installation of the laser drivers, electrical connections (e.g., flying leads) may be soldered between the laser light sources and a corresponding laser driver.

Figure 4:
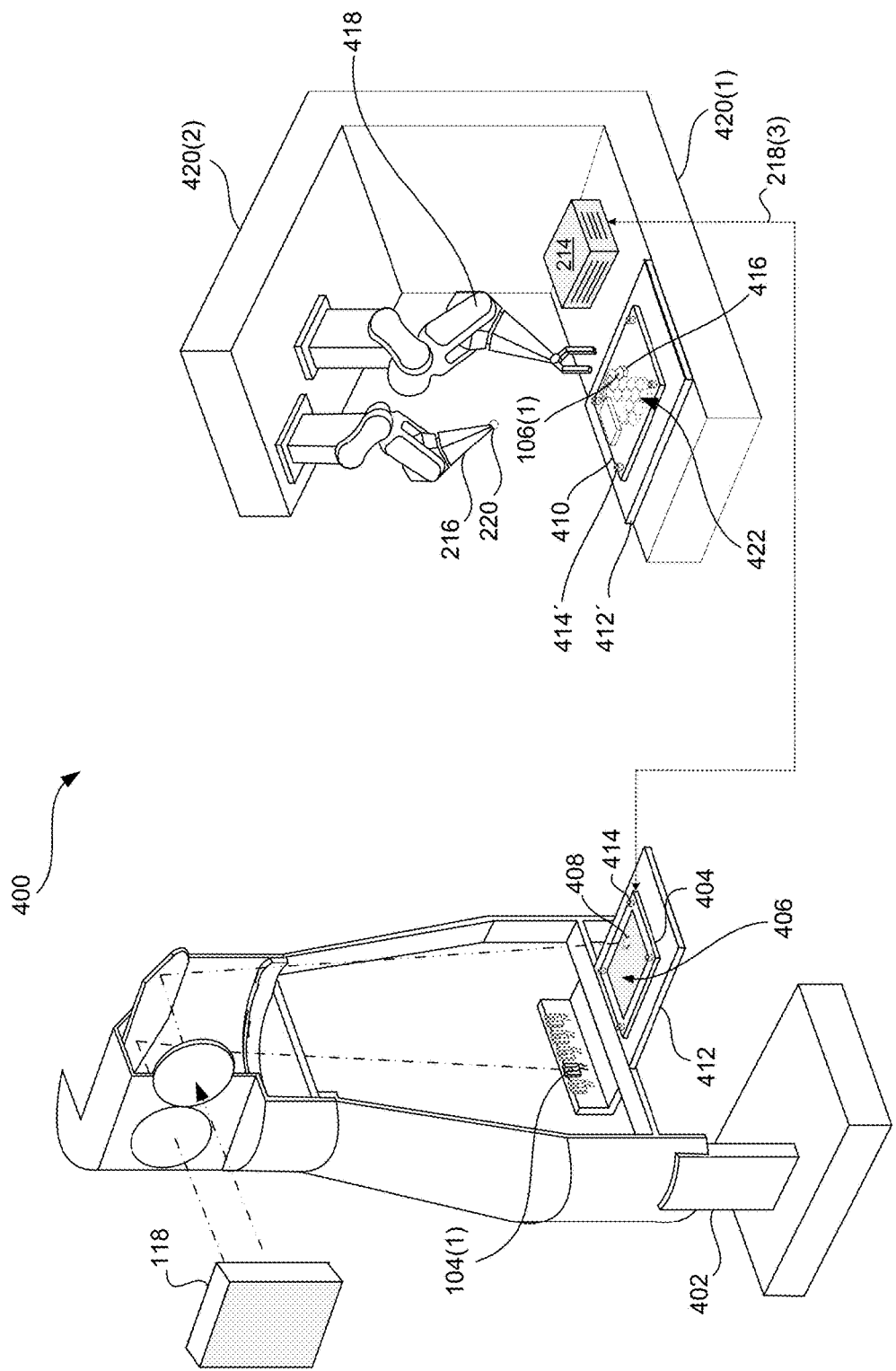
FIG. 4 illustrates an example system for aligning sensors within a LIDAR assembly with respect to an installed optical component of the LIDAR assembly.

FIG. 4 illustrates an exemplary system 400 for aligning light sensors 106 within a LIDAR assembly 100 with respect to installed optical components such as laser light sources 104 of the LIDAR assembly 100. The system 400 may include a fixture 402 to support the LIDAR assembly 100 with respect to an object 118 so that the LIDAR assembly 100 can emit light toward the object 118. For example, a laser light source 104(1) may be caused to emit at least one pulse of light (e.g., at least a steady beam of light and/or intermittently pulsing beams of light) by a laser driver of the LIDAR assembly 100 and/or a laser driver of a control unit 214. The system 400 may include a light sensor 404 that is communicatively coupled to the control unit 214 to pass (e.g., transmit) detected light signals from the light sensor 404 to the control unit 214. In some examples, the light sensor 404 is configured to produce detected light signals indicating at least a region of the light sensor 404 that is receiving light, and/or indicating an intensity of light detected in the region or location. For example, the light sensor 404 may include a sensitive area 406 which is configured to produce electric signals indicative of light intensities experienced across the sensitive area 406. For example, the light sensor 404 may be a charge-coupled device (CCD) or Complementary Metal-Oxide-Semiconductor (CMOS) light sensor or a complementary metal-oxide-semiconductor (CMOS) light sensor that is communicatively coupled to the control unit 214 via a communications channels 218(3). As the laser light source 104(1) is caused to emit pulses of light that are reflected back as reflected pulses of light which strike the sensitive area 406, the light sensor 404 may produce detected light signals which indicate a region 408 of the sensitive area 406 that is receiving the reflected light. Based on the detected light signals, the control unit 214 may determine, identify, map, and/or translate the region 408 of the sensitive area 406 onto a sensor board 410 that is to be installed into the LIDAR assembly 100 to support one or more light sensors 106.

In some examples, the light sensor 404 may be configured to mate with a mounting structure 412 of the LIDAR assembly 100 that is configured to couple to the sensor board 410. For example, the mounting structure 412 may include one or more threaded studs 414 that are sized and spaced to protrude through one or more mounting holes of the sensor board 410 and each to receive a corresponding nut to secure the sensor board 410 to the mounting structure 412. Additionally, or alternatively, the mounting structure 412 may include one or more alignment pins (not shown) in addition to, or in lieu of, one or more of the threaded studs 414 that are sized and spaced to protrude through one or more mounting holes of the sensor board 410 to aid in positioning the sensor board 410. The light sensor 404 may be specifically configured to match this mounting pattern so that the light sensor 404 can mate with the mounting structure 412 in a similar or identical manner to sensors 106. For example, in some implementations, the light sensor 404 may be placed over the top of the mounting studs 414 and may even be tightened down with corresponding nuts. Based on the mounting of the light sensor 404 on the mounting studs 414, and based on a known relationship between the locations on the light sensor 404 and locations on the sensor board 410, the control unit 214 may translate the region 408 of the light sensor 404 to an optimal location 416 on the sensor board 410.

In some examples, the system 400 may include a robot arm 418 that is coupled to a support base 420 and is configured to place a light sensor 106(1) at the optimal location of the sensor board 410. For example, the support base 420 may include a lower support 420(1) and an upper support 420(2). The lower support 420(1) may include a mounting structure 412' with mounting studs 414' which replicate the studs 414. The robot arm 418 position may be known with respect to the mounting structure 412' and studs 414' so that the control unit 214 may cause the robot arm 418 to place the light sensor 106(1) at the optimal location 416 of the sensor board 410 and maintain its location while the light sensor 106(1) is coupled to the sensor board 410. For example, following an application of an adhesive (such as an epoxy resin) to the sensor board at the optimal location 416 or to the light sensor 106(1), the robot arm 418 may place and maintain the light sensor 106(1) at the optimal location 416 while the adhesive cures. In some examples, the system 400 may also include an adhesive dispenser 216 to deposit adhesive (e.g., the adhesive 220) onto the sensor board 410 and/or onto the light sensor 106(1). Once the light sensor 106(1) has been coupled to the sensor board 410, the control unit 214 may cause the robot arm 418 to release the light sensor 106(1) so that the sensor board 410 can be removed from the mounting structure 412' and installed into the LIDAR assembly 100 (e.g., onto the mounting structure 412).

Accordingly, using the system 400 enables customization of a mass produced sensor board specifically for a particular unit of a LIDAR assembly 100. For example, a customized sensor board may be associated with a unique identifier that corresponds specifically to a unique identifier of a LIDAR assembly. Customization of the sensor board 410 enables the light sensor 106(1) to be coupled to the housing 102 of the LIDAR assembly, e.g., by fastening the sensor board 410 to the mounting structure 412 via the studs 414, at an optimal alignment that is determined based on an installed location and/or alignment of a corresponding light source 104(1). In some examples, the light sensor 106(1) may be coupled directly to the housing 102 or a sensor board that is already installed into the housing. In some examples, the control unit 214 may cause the robot arm 418 or 206 to enter the sensor compartment 110 to maintain the sensor 106 at optimal alignment within the LIDAR assembly as it is installed directly into the LIDAR assembly.

In some examples, the control unit 214 may be configured to prompt a user to provide (e.g., via a user interface) an indication as to whether the light sensor 404 is currently mated to the mounting structure 412. Further, in some examples, the control unit 214 may provide an instruction to a human operator to place the light sensor 404 into the LIDAR assembly 100. The human operator may then indicate completion of this step to inform the control unit 214 that it can proceed with determining the optimal location of the sensors. In some examples, the control unit 214 may cause a robot arm to install the light sensor 404 onto the mounting structure 412.

In some examples, the sensor board 410 may be configured to support a sensor array 422 that includes a plurality of sensors 106(2)-106(N) (shown in a relatively lighter gray) each having a corresponding photo-sensitive area. The robot arm 418 may be used to successively install each of the sensors onto the sensor board. In some examples, the sensitive area 406 of the light sensor 404 may be larger than an area of the sensor board which is available to arrange and support the sensor array 422. For example, the aggregated sum of all of the corresponding photo-sensitive areas of the sensors 106 of the sensor array 422 may be less than the photo sensitive area 406. In some implementations, the system 400 may be configured to determine a plurality of optimal locations successively while the light sensor 404 remains installed in the LIDAR assembly 100. For example, in an implementation in which the LIDAR assembly 100 includes 38 channels, with each channel having a designated laser 104 and a corresponding designated sensor 106, the system 400 may cause each of the 38 lasers 104(1)-104(38) to successively emit one or more pulses of light from which 38 optimal locations may be determined. Upon determining the optimal location corresponding to each channel, the robot arm 418 may be caused to successively maintain each sensor at its optimal location while adhered to the sensor board 410. In some implementations, the sensors may be adhered to the sensor board while the sensor board is already installed into the LIDAR assembly 100. In some implementations, the sensors may be adhered to the sensor board outside of the LIDAR assembly 100 as shown in FIG. 4.

In some implementations, the plurality of lasers 104 may be installed into the LIDAR assembly 100 with nominal dimensions intended to result in an intended array pattern at the sensor board, e.g., to cause the reflected pulses of light to create the intended array pattern. As conventional manufacturing processes may result in some amount of deviation from nominal dimensions, an actual array pattern produced by the lasers 104 may deviate from the intended array pattern. In some examples, the sensitive area 406 of the light sensor 404 may be at least partially oversized with respect to a potential array area that is determinable based on the nominal dimensions and associated tolerances.

Figure 5:
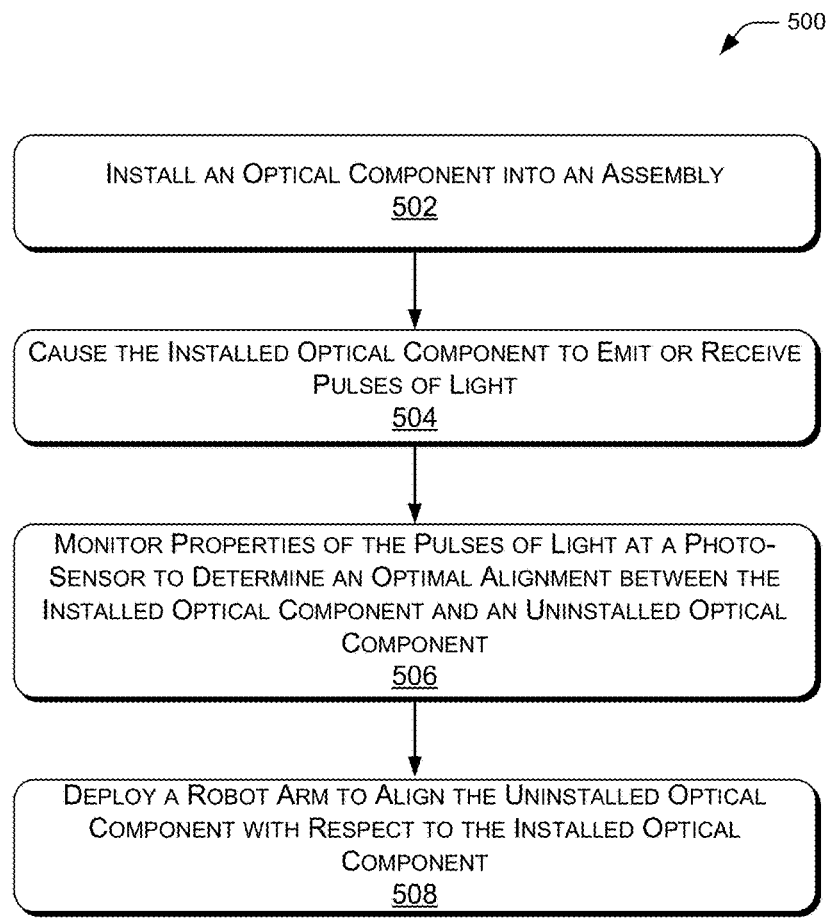
FIG. 5 is a flow diagram of an example process to robotically align uninstalled optical components in an assembly with respect to an installed component of the assembly by causing the installed component to emit or receive pulses of light.

FIG. 5 is a flow diagram of an illustrative process 500 to robotically align uninstalled optical components in an assembly with respect to an installed component of the assembly by causing the installed component to emit or receive pulses of light.

At block 502, an optical component is installed into an assembly such as, for example, a LIDAR system or other optical system in which aligning two or more optical components is desirable. In some examples, installing an optical component may include installing a single laser light source or multiple laser light sources into a housing of a LIDAR system. For example, a LIDAR system may include a multitude of channels (e.g., 38 channels), one or more of which may correspond to a laser that is coupled to a laser support structure of the LIDAR system at block 502. In some examples, installing the optical component may include installing one or more light sensors into the LIDAR assembly. For example, a sensor board that includes an array of sensors may be installed at block 502. Other exemplary optical components which may be installed at block 502 include any other type of component which may affect an alignment of an uninstalled optical component once it is installed. For example, block 502 may include installing, for example, one or more of the first lens 114, one or more of the second lens 116, or the one or more mirrors 120. Each of the one or more first lens 114, the one or more second lens 120, and the one or more mirrors 120 may contribute to the transmission of the pulses of light from an emitter to a sensor.

At block 504, a first optical component may be caused to either emit or receive pulses of light. For example, in implementations in which the first optical component is a laser light source, the operation of block 504 may include causing the laser light source to emit a steady beam of light or a series of light pulses. In implementations where the first optical component is a light sensor, the operation at block 504 may include causing a yet to be installed light source to emit light that is ultimately reflected to and received by the light sensor. In some implementations, the yet to be installed laser light source may be moved through a series of different alignments while emitting light in order to develop information about the different alignments such as, for example, how the intensity of reflected light received by the sensor varies throughout the alignments.

At block 506, properties associated with the pulses of light may be monitored at a sensor and may be used to determine an optimal alignment between the optical component installed at block 502 and the yet to be installed optical component. For example, in implementations in which the installed optical component is a light source (e.g., laser 104) that is caused to emit light at block 504, the operation at block 506 may include monitoring reflected pulses of light at a light sensor that is temporarily installed into the LIDAR assembly, e.g., light sensor 404. In implementations where the installed component is a sensor (e.g., sensor 106) that is caused to receive light at block 504, the operation at block 506 may include monitoring the installed sensor for reflected pulses of light that are emitted by an uninstalled light source. In either of the foregoing implementations, the optimal alignment for an uninstalled component may be determined relative to an installed component. Accordingly, difficulties associated with manufacturing tolerances associated with one component stacking up with respect to manufacturing tolerances associated with another component are mitigated.

At block 508, a robot arm may be used to optimally align the uninstalled component with respect to the installed component. For example, in an implementation in which the installed component is a sensor and the uninstalled component is a laser, block 508 may include causing a robot arm to maintain the laser at the optimal alignment determined at block 506 for an adhesive cure period during which an adhesive cures to secure the laser to the LIDAR assembly. Such an implementation corresponds to FIG. 2. Alternative, in an implementation in which the installed component is a laser and the uninstalled component is a sensor, the robot arm may be controller to optimally locate the sensor on a sensor board which is subsequently installed into the LIDAR assembly. Such an implementation corresponds to FIGS. 4A and 4B.

Figure 6:
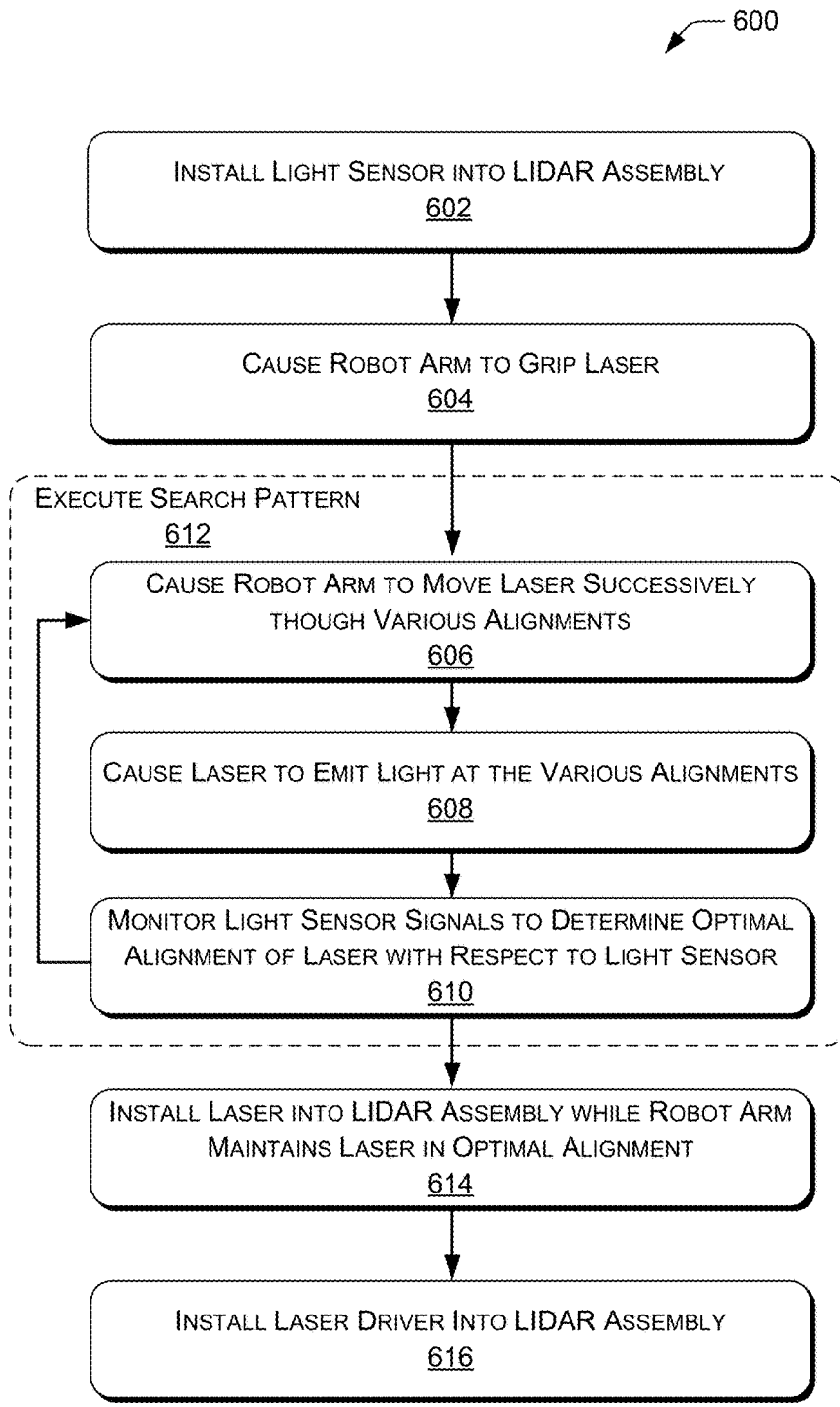
FIG. 6 is a flow diagram of an example process to robotically align uninstalled light sources in an assembly with respect to installed light sensors of the assembly.

FIG. 6 is a flow diagram of an illustrative process 600 to robotically align uninstalled light sources in an assembly with respect to installed light sensors of the assembly.

At block 602, one or more light sensors is installed into a LIDAR assembly. For example, a sensor board 210 having an array of sensors 106(1)-106(N) attached thereto may be coupled to a housing 102 of a LIDAR assembly 100. In some examples, the sensor board 210 may include an array of avalanche photodiodes (APDs) that each convert light intensity to a corresponding electrical signal. In some examples, each APD may correspond to a particular laser, such that the particular laser is controlled to emit light to be received by the APD. Further, a controller may be configured to transmit a reference signal to the APD at a moment corresponding to when one or more pulses of light are emitted by the particular laser. Such a reference signal may be used by the LIDAR system to measure an elapsed time between emitting a pulse (e.g., by a particular laser) and receiving a corresponding reflected pulse (e.g., by the corresponding APD).

At block 604, a robot arm may be caused to grip a laser that corresponds to a sensor of the LIDAR system. For example, a channel corresponding to sensor 106(1) may be selected to have its corresponding laser 104(1) installed. Accordingly, at block 606, the robot arm may be caused to move the gripped laser to a position within the LIDAR assembly that is designated for the laser 104(1). Once positioned within a designated spot, the robot arm may be caused to successively move the laser 104(1) through a plurality of alignment variations. For example, the robot arm may rotate an optical axis of the laser as illustrated by patterns 224 of FIG. 2.

At block 608, the laser 106(1) may be caused to emit pulses of light when aligned at various positions of the aliment variations. In some examples, the laser may be driven during block 608 by a laser driver and/or electrical circuit that is built into the robot arm. For example, as shown in FIG. 3, an exemplary robot arm 206 may include a robot grip 300 with built-in electrical contacts to pulse current into a laser diode. The electrical contacts of the robot grip may be coupled to a laser driver that is dedicated to the system 200, as opposed to a laser driver that will ultimately be installed to drive the laser during operation of the LIDAR system. For example, a designated laser driver may be built into or controlled by the control unit 214 during performance of processes 500 or 600.

At block 610, signals that are produced by the sensor installed at block 602 responsive to the light emitted at block 608 may be monitored to determine an optimal alignment of the laser being moved by the robot arm with respect to the installed sensor. In some examples, the operations associated with blocks 606 through 610 may correspond to executing a search pattern at block 612. For example, the control unit 214 may cause the robot to perform a first movement while holding the laser while the laser emits light. For example, with reference to FIG. 2, the robot arm 206 may rotate an axis or otherwise control a position of the laser to generate the first pattern 224(1) while the control unit 214 simultaneously monitors detected light signals being produced by the sensor. Then, based on the signals received at block 610 the control unit may determine a second movement to perform. For example, the control unit 214 may determine that, of the signals received during the first movement, the "best" signal was received when the laser was at a position resulting in the illumination of the upper left portion of the pattern 224(1) shown on the object 118. As a result, the control unit 214 may cause the robot to perform a second movement with the laser, e.g., the movement resulting in pattern 224(2), while the laser emits light. In some examples, executing the search pattern at block 612 may continue until subsequent movements are unable to progressively increase the quality of the signals produced by the sensor. In some examples, executing the search pattern may continue until the signal quality reaches or surpasses an acceptable quality threshold.

Once the optimal alignment for the laser with respect to the sensor is determined, the process may proceed to block 614 at which the laser may be installed into the LIDAR assembly while the robot arm maintains the laser in the optimal alignment. For example, an adhesive may be applied to a laser support structure or directly the laser itself and then the robot arm may bring the laser into contact with the laser support structure and maintain the optimal alignment while the adhesive cures.

In some implementations, operations 602 through 614 may occur prior to a laser driver for the laser installed at block 616 being installed into the LIDAR assembly. For example, in some implementations, a laser driver that will ultimately be used to drive the laser during operation of the LIDAR assembly may ultimately be installed adjacent to the laser and opposite the direction the laser emits light. With reference to FIG. 2, the LIDAR assembly 100 may include a driver board 226 that is to be positioned underneath the lasers once installed. In order to provide space for the robot arm to operate during operations 602-614, installation of the driver board 226 may be postponed, in some implementations, until after the lasers are installed into the LIDAR assembly.

Figure 7:
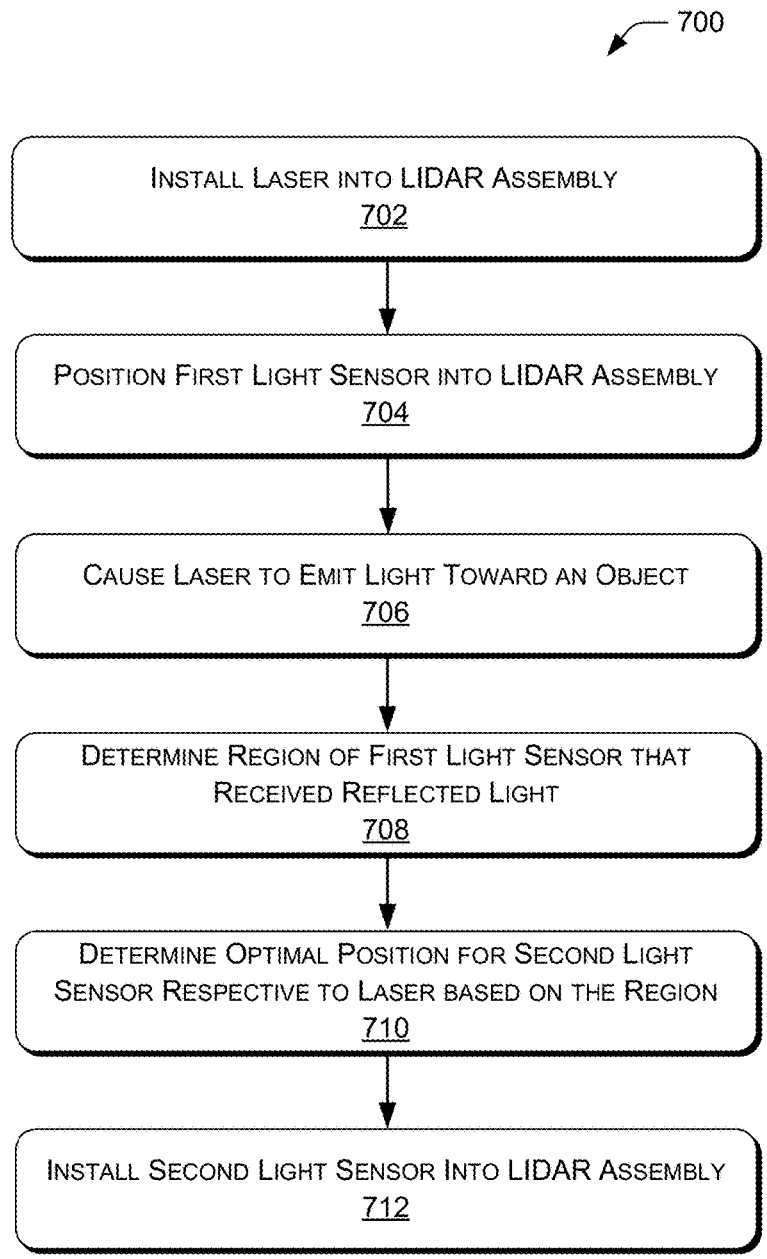
FIG. 7 is a flow diagram of an example process to robotically align uninstalled light sensors into an assembly, or onto a component thereof, with respect to installed light sources of the assembly.

FIG. 7 is a flow diagram of an illustrative process 700 to robotically align uninstalled light sensors onto a component of an assembly with respect to installed light sources of the assembly.

At block 702, a laser may be installed into a LIDAR assembly at a position and alignment at which it will operate during normal operation. For example, with reference to FIG. 4, one or more lasers including laser 104(1) may be installed into the LIDAR assembly to enable it to emit light through the emitter compartment 112 toward a mirror 120 which re-directs the light through the lens 114 and ultimately toward an object 118. In some examples, the laser drivers that will be permanently installed into the LIDAR assembly may also be installed and used to drive the laser(s) during the operations of process 700.

At block 704, a temporary light sensor may be positioned within the LIDAR assembly. For example, as illustrated in FIG. 4, the light sensor 404 may be mated with the mounting structure 412 inside of the sensor compartment 110. As illustrated, in some examples, the light sensor 404 may include a sensitive area 406 that is larger than the region 408 that ultimately receives the reflected pulses of light.

At block 706, the installed laser may be caused to emit light toward the object 118, which in turn reflects at least some of the light back to the LIDAR assembly. The reflected light then enters the LIDAR assembly, e.g., through the lens 116, toward a location where a second sensor will ultimately be positioned.

At block 708, detected light signals produced by the first sensor in response to the reflected light that has entered the LIDAR assembly may be used to determine a region of the first sensor that receives the reflected light. In some implementations, the first sensor may be a CCD light sensor that is capable of indicating both an intensity of light that hits the sensor and a region of the sensor that is hit. For example, the light sensor 404 may be a multi megapixel CCD sensor having multiple millions of photosites each of which may convert light intensity into a corresponding electrical signal. In some instances, the light sensor may 404 may correspond to a CMOS light sensor. Accordingly, the region receiving light may be determined based on identifying a cluster of photosites returning signals indicative of high light exposure. In some implementations, determining the region at block 708 may include identifying a cluster of highly exposed photosites (e.g., highly exposed as compared to other photosites of the light sensor 404) and determining a centroid of the highly exposed region.

At block 710, an optimal position for a permanent light sensor to be positioned within the LIDAR assembly may be determined based on the region identified at block 708. With reference to FIG. 4, for example, in some implementations, the first sensor may be configured to mate with a mounting structure 412 and/or mounting studs 414 which ultimately will be used to couple the second sensor to the LIDAR assembly. As a result, various identifiable locations of the light sensor 404 such as discrete photosites may be accurately positioned within the LIDAR assembly to enable the region identified at block 708 to be accurately translated to the sensor board 410.

At block 712, the permanent light sensor may be installed into the LIDAR assembly at the optimal position. In some implementations, the permanent light sensor may be initially installed onto the sensor board 410 and then subsequently coupled to the LIDAR housing via the sensor board 410 being installed onto the mounting structure. Such an implementation is described in relation to FIG. 4 in which a robot arm 418 is used to install the sensor 106(1) onto the sensor board 410 while it is mated with the mounting structure 412' with mounting studs 414' which match the studs 414 onto which the sensor board 410 will untimely be coupled to when installed into the actual LIDAR assembly.

Although each of the laser and the sensor may be installed with some degree of allowable deviation from an intended nominal position (e.g., some allowable tolerance), the systems and methods of the present disclosure enable an uninstalled optical component to be installed to a nominal position and/or orientation that is measured with respect to the actual—not nominal—location of an installed component. As a result, the allowable tolerances which must be adhered to using conventional manufacturing processes—in which tolerances associated with each of the laser and the sensor would stack—are relatively tighter than the tolerances which are allowable using the systems and methods described herein. Stated alternatively, the systems and methods of the present disclosure allow for manufacturing tolerances to be relaxed so that manufacturing a functional LIDAR system becomes easier.

Figure 8A:
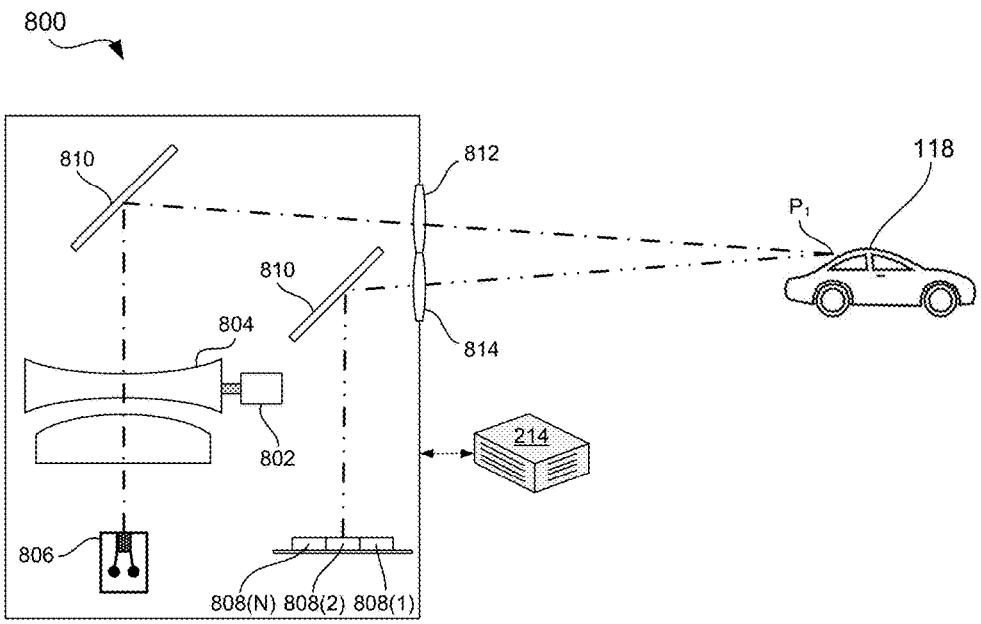
FIGS. 8A and 8B illustrate an example system for using an actuator to dynamically adjust a lens disposed in front of a light source to control an optical path of light emitted by a LIDAR assembly.
Figure 8B:
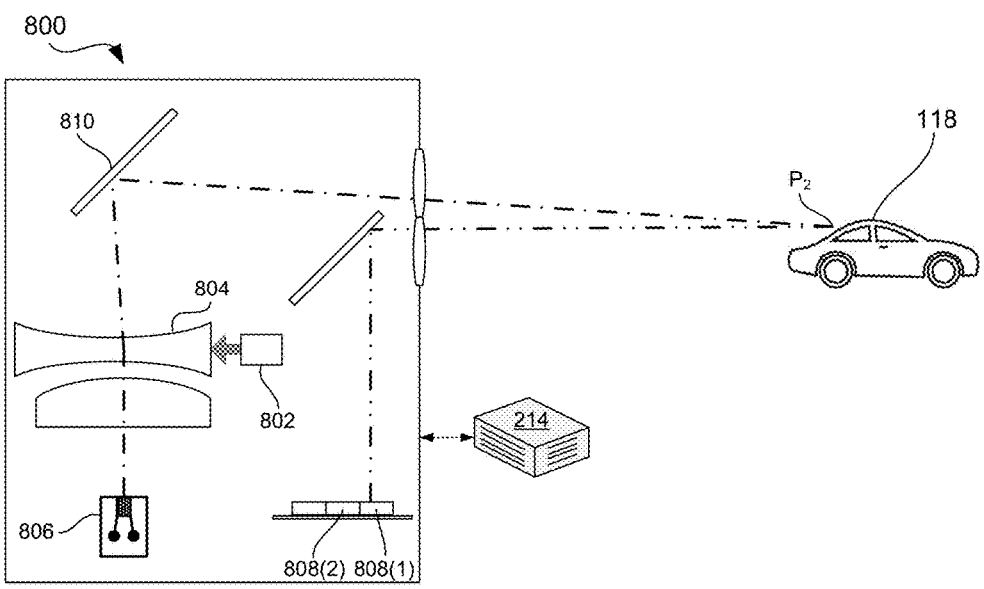

FIGS. 8A and 8B illustrate an exemplary system 800 for using an actuator 802 to dynamically adjust a lens 804 that is disposed in front of a light source 806 to control an optical path of light emitted and/or received by a LIDAR assembly. As discussed above, the actuator 802 may be configured for movement in multiple different degrees of freedom. In some examples, the actuator 802 may be a piezo electric actuator that is used to adjust a solid lens. As another example, the actuator may include a Tunable Acoustic Gradient (TAG) index of refraction lens. In some examples a TAG index of refraction lens having a relatively fast temporal response (e.g., ~1 micro-second or less) may be used. In some examples, the actuator 802 may actuate a liquid lens to adjust one or both of tilt along one or more axis and/or to vary focus of the liquid lens. For example, the actuator may include a liquid lens assembly configured to vary a voltage around an outer perimeter of a liquid lens to alter a shape of a boundary between two mediums such as, for example, water and oil. The system 800 may also include a control unit 214 communicatively coupled to one or more of the actuator 802, sensors 808 (e.g., including sensors 808(1), 808(2), . . . , 808(N)), and/or light sources 806 (including corresponding light sources 806(1), 806(2), . . . , 806(N)) via various communications channels 218. The control unit 214 may include one or more processor(s) and computer readable storage media storing instructions for performing various operations described herein. For example, the control unit 214 may be used to perform operations described with relation to systems 800, 900, and 1000 and with relation to process 1100.

In some examples, the actuator 802 may be used during an initial calibration of one or more channels of the system 800. For example, upon a triggering event (e.g., being powered on for the first and/or each subsequent time, each time a vehicle starts, in response to an impact such as caused by a vehicle striking a pothole, in response to a temperature change, or based on a predetermined schedules, e.g., once a month, week, year, etc.), the actuator 802 may be used by the system 800 to execute a search pattern to identify an optimal alignment of the lens 804 with respect to other optical components of the system 800 such as, for example, the light source 806(1). For example, consider a case where the light source 806(1) is one of a plurality of light sources within the system 800, and consider a case where the light source 806(1) corresponds to light sensor 808(1) of the light sensors 808(1)-808(N). In particular, the light source 806(1) and light sensor 808(1) correspond to a channel (e.g., channel 1). However, in an initial state of the system 800 as shown in FIG. 8A, the optical path terminates at the sensor 808(2) as opposed to 808(1), corresponding to a misalignment of the system 800. That is, in the initial state (shown in FIG. 8A), the reflected light misses the intended sensor 801(1). Accordingly, the detected light signals produced on channel 1 will be poor or non-existent as the light is predominantly striking a sensor of a different channel (e.g., channel 2) on which light sensor 808(2) is designated to operate. Furthermore, the misalignment of the optical path may cause noise or false readings on channel 2.

With reference to FIG. 8B, the optical path is illustrated as having been corrected to strike the sensor 808(1) which corresponds the light source 806(1) on channel 1. For example, the lens 804 is shown as having a convex shape to re-direct rays of light via refraction as light passes through the lens 804. Accordingly, as the actuator 802 is shown to shift the lens 804 to the left, the optical path is also angled slightly left upon exiting the lens 804. In the illustrated embodiment, shifting the lens 804 to the left causes pulses of light emitted from the light source 806(1) to strike a mirror 810 at a slightly lower position in FIG. 8B than in FIG. 8A. As a result, the remaining optical path is altered such that emitted light exits a first lens 812 at an altered position and/or angle of incidence which causes the emitted light to strike an object 118 at a point that is different in FIG. 8A than FIG. 8B, which in turn alters the intensity of reflected light received by the sensor 808(1).

In some examples, the system 800 may be designed to minimize overlap between the fields of view of the individual sensors corresponding to the discrete channels. For example, the field of view of sensor 808(1) may be limited so that a negligible amount or even none of the reflected light of FIG. 8A reaches the sensor 808(1). Stated alternatively, the point $P_1$ at which the emitted light strikes the object (e.g., midway up the bumper) is outside of the field of view of sensor 808(1). As a result, when the lens 804 is positioned as illustrated in FIG. 8A, the sensor 808(1) would produce none or minimal detected light signals in response to the light source 806(1) emitting pulses of light. Upon the lens 804 being shifted left as shown in FIG. 8B, light emitted by the light source now strikes the point $P_2$ (e.g., the lower portion of the bumper) that is within the field of view of sensor 808(1). Therefore, when the lens 804 is optimally positioned as illustrated in FIG. 8B, the sensor 808(1) would produce detected light signals of sufficient quality in response to the light source 806(1) emitting pulses of light to perform ranging calculations with respect to the object.

In some examples, the system 800 may include a plurality of channels and may be configured to perform a calibration protocol with respect to each channel. For example, in an embodiment including N channels, the system 800 may be configured to initially calibrate channel 1 by monitoring detected light signals produced by light sensor 808(1) while the light source 806(1) is being caused to emit pulses of light. Then, the actuator 802 may be caused to successively move the lens 804 through a plurality of alignments while the detected light signals are being monitored in order to determine an optimal alignment for the lens 804 (or any other optical component of the assembly such as, for example, the mirror 810 or the lenses 812 or 814). Once the optimal alignment is determined, the actuator 802 may maintain the optimal position during operation of the system.

In some examples, the system 800 may be configured to use the actuator 802 to re-calibrate channels of the system 800 during operation. For example, in various implementations, the system 800 may be exposed to environmental factors during operation such as, for example, being exposed to vibrations and shock or moving with respect to the object. These environmental factors may affect the optical path in various ways. For example, the system 800 may be integrated into a vehicle such a car or truck which may experience road vibrations while driving. These vibrations may affect the alignment of one or more optical components of the system 800. For example, a vehicle may drive over a speed bump and the associated shock may slightly alter the alignment of the mirror 810 which in turn may affect the optical path for the system's channels and, therefore, the detected light signals that the sensors of each channel produce. In some examples, the system 800 may identify changes in the quality of detected light signals and respond accordingly to continually optimize the quality. For example, the system 800 may identify that the quality of the detected light signals corresponding to channels 1, 3, 7, and 11 has deteriorated from one point in time to another, e.g., from the time immediately before the shock occurred to a point in time after the shock occurred. In response, the system may selectively recalibrate channels 1, 3, 7, and 11 or the system may recalibrate all channels. For example, a search pattern such as described in relation to block 612 of FIG. 6 may be performed with respect to each channel.

In some instances, the actuator 802 may control one or more dimensions (e.g., one or more of an x-, y-, z-, roll-, pitch-, or yaw-direction) of one or more optical components of the system 800. In some instances, the system 800 may include one or more calibration surfaces that produce a known or expected response (e.g., a maximum response, a null response, etc.). For example, a calibration surface may include a surface that is fixed relative to the LIDAR assembly (e.g., a surface of a housing of the LIDAR assembly or a surface to which the LIDAR assembly is mounted). When the actuator 802 aligns the lens to emit light toward the reference surface, the corresponding detector will receive a known or expected return. The reference surface(s) may be used during calibration of the LIDAR assembly. Similar aspects may be applied to the system described in connection with FIG. 9A and FIG. 9B.

Figure 9A:
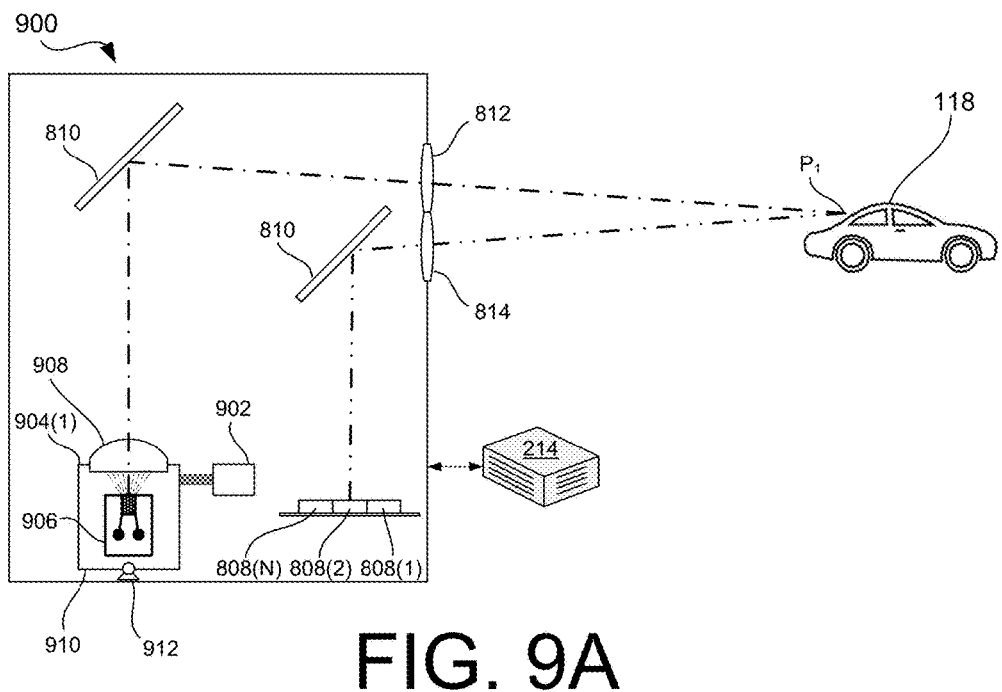
FIGS. 9A and 9B illustrate an example system for using an actuator to dynamically adjust a laser light source to control an optical path of light emitted by a LIDAR assembly.
Figure 9B:
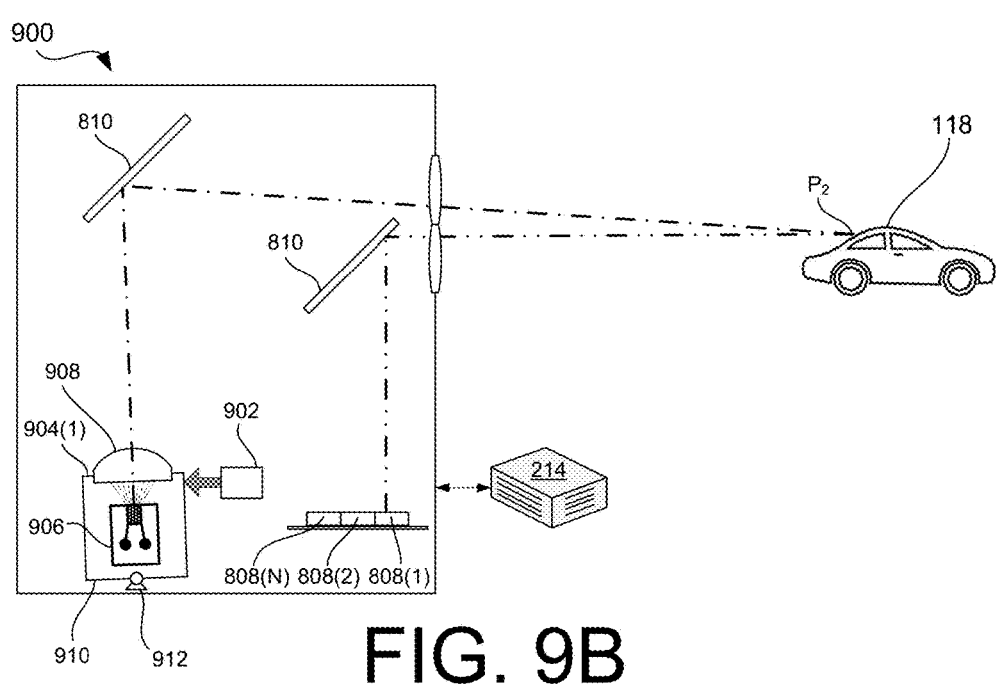

FIG. 9A and FIG. 9B illustrate an exemplary system 900 for using an actuator 902 to dynamically adjust a light source 904(1) to control an optical path of light emitted by a LIDAR assembly. In some examples, the light source 904(1) may include a laser emitting diode 906 to shine light through a collimator lens 908. The light source 904(1) may also include a housing 910 that is coupled to a pivotable hinge 912 about which the light source 904(1) may tilt or rotate when pushed or pulled by the actuator 902 which is also coupled to the housing 910. The system 900 is similar to the system 800 in that the actuator 902 may be used to control the optical path in order to optimize the quality of detected light signals received at the sensor(s) corresponding to each channel. For example, as shown in FIG. 9A, the light being emitted by the light source 904(1) is directed toward the mirror 810, which in turn redirects the light through the lens 812 toward point $P_1$ of the object 118. As described with relation to FIGS. 8A and 8B, the point $P_1$ may be outside of or not optimally centered within a field of view of the sensor 808(1). For example, as FIG. 9A illustrates a misalignment position, in which the path of the reflected light is centered on sensor 808(2) which may correspond to a light source of the system 900 other than the light source 904(1). FIG. 9B illustrates an alignment position, in which the actuator 902 is used to tilt the light source 904(1) and, therefore, the light path to the left (or to the right, for example) to cause the emitted light to strike the mirror at a different angle and/or position, exit the lens 812 at a different angle or position and, ultimately, strike the object at the point $P_2$. As illustrated, the result of tilting the light source 904(1) may be that the intensity of the reflected pulses of light striking sensor 808(1) increases and the intensity of the reflected pulses of light striking sensor 808(2) decreases. Therefore, similar to system 800, the system 900 includes optical components which can be actuated into an optimal alignment to fine tune the optical paths of the corresponding to the various channels in the system 900.

Although each of systems 800 and 900 illustrate one or more optical components that are situated between a light source and an object, it will be appreciated that the scope of the present disclosure is not limited to moving components on the emission side of the optical path (e.g., the light sources 806 and 904, the lens 804, the mirrors 810, the lenses 812, etc.). In particular, it is within the scope of the present disclosure to control the optical path by moving (e.g., tilting and/or translating) one or more optical components on the detection side of the optical path (e.g., mirrors 810, the lens 814, the one or more sensors 808, etc.).

Figure 10A:
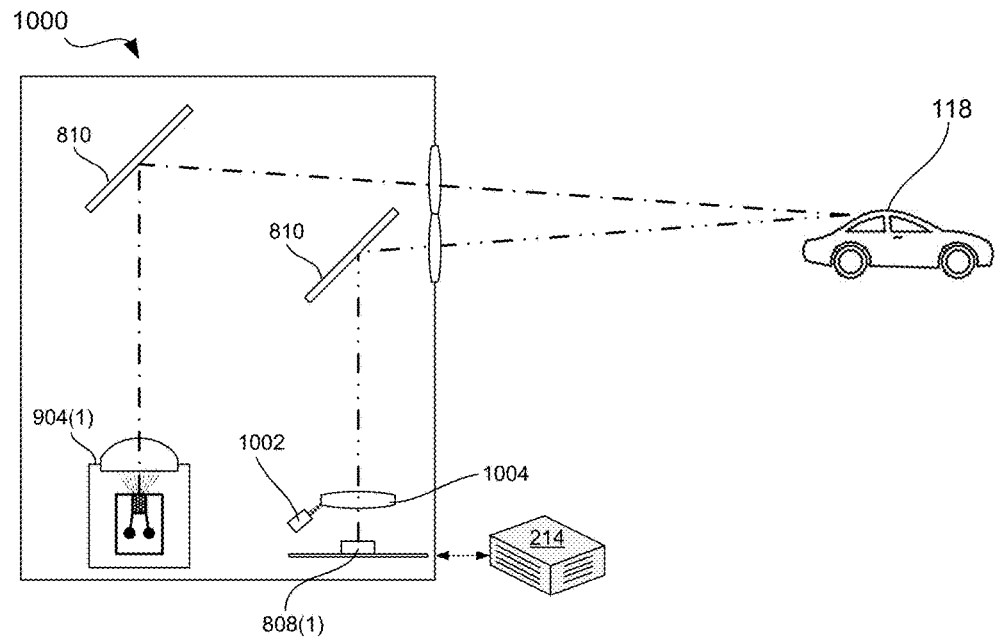
FIGS. 10A and 10B illustrate an example system for using an actuator to dynamically adjust a lens disposed in front of a light sensor to control an optical path of light received by a LIDAR assembly.
Figure 10B:
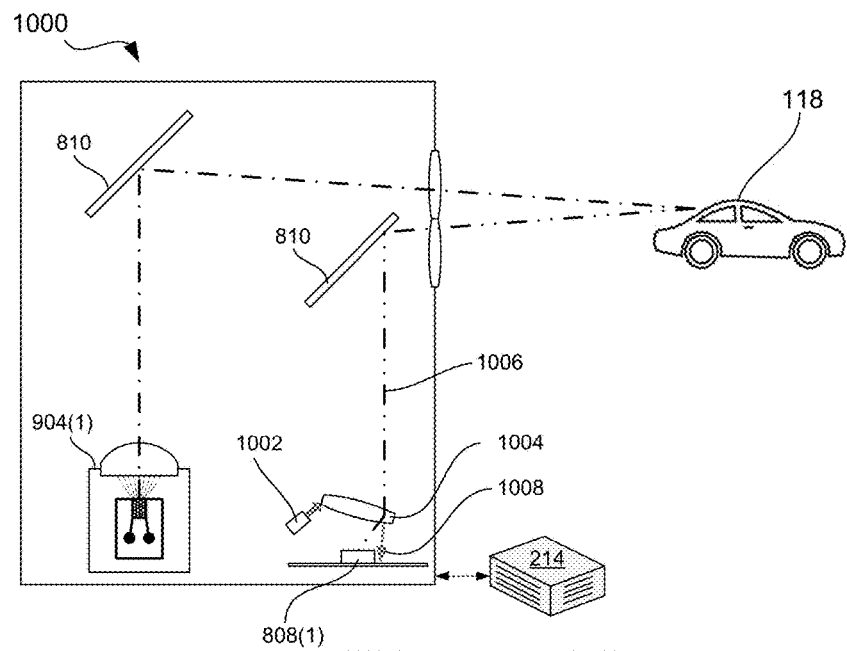

FIG. 10A and FIG. 10B illustrate an exemplary system 1000 for using an actuator 1002 to dynamically adjust a lens 1004 disposed in front of a light sensor 808(1) to control an optical path of light emitted by a LIDAR assembly. As illustrated, the light source 904(1) is fixed with respect to the system 1000. However, in some examples, the light source 904(1) and/or one or more other emission side optical components such as, for example, a lens 804 may additionally, or alternatively, be coupled to actuator(s) usable to control the optical path.

In some examples, the lens 1004 is a concave lens that is coupled to the actuator 1002 to tilt and/or shift the lens 1004 to redirect a path of reflected light toward the sensor 904(1). For example, as shown in FIG. 10B, the reflected light path 1006 (shown in a dashed double dot line pattern) is redirected by the lens 1004 toward the sensor 808(1) as compared to an alternate path 1008 which would miss the sensor 808(1). In particular, the alternate path 1008 represents the path the reflected light would have traveled if the incoming reflected light were as illustrated in FIG. 10B while the position and alignment of the lens were as shown in FIG. 10A. As mentioned above, in some instances, the sensor 808(1) may additionally, or alternatively, be coupled to an actuator to control a position of the sensor during calibration and/or operation of the system.

As illustrated in FIGS. 10A and 10B, although the path of the emitted light remains unchanged until hitting the object 118, a change to the position of the object 118 relative to the system 1000 may have an effect on the path of the reflected light which enters the system 1000. For example, the object 118 is illustrated as comparatively closer to the system 1000 in FIG. 10B than in FIG. 10A. As a result of a change in position of the object 118 between FIG. 10A and FIG. 10B, the movement may cause the reflected light to drift away from the sensor 808(1). Accordingly, as the object 118 approaches the system 1000, the quality of the detected light signals produced by the sensor 808(1) in response to light produced by light source 904(1) may deteriorate due to parallax as the light begins to strike the sensor less directly and/or less of the light strikes the sensor (if any at all). In examples in which the system 1000 is a LIDAR system, this deterioration would normally cause ranging capabilities to cease or degrade. However, the techniques described herein may allow the system 1000 to compensate for the parallax by redirecting the path of the reflected back toward the light sensor 808(1), thus expanding the range of the LIDAR system to accurately detect distances of near objects as well as objects farther away.

In some examples, the system 1000 may be configured to monitor a quality (e.g., strength, intensity, and/or signal-to-noise ratio) corresponding to light transmitted between individual channels of the system 1000 and to continually and/or periodically adjust one or more optical components, e.g., the lens 1004, in order to account for drifting of the path of the reflected light. As a result, the system 1000 may cure the deficiency of many conventional optical systems including, for example, conventional LIDAR systems which lose ranging abilities of objects within a certain range of proximity to the system.

Figure 11:
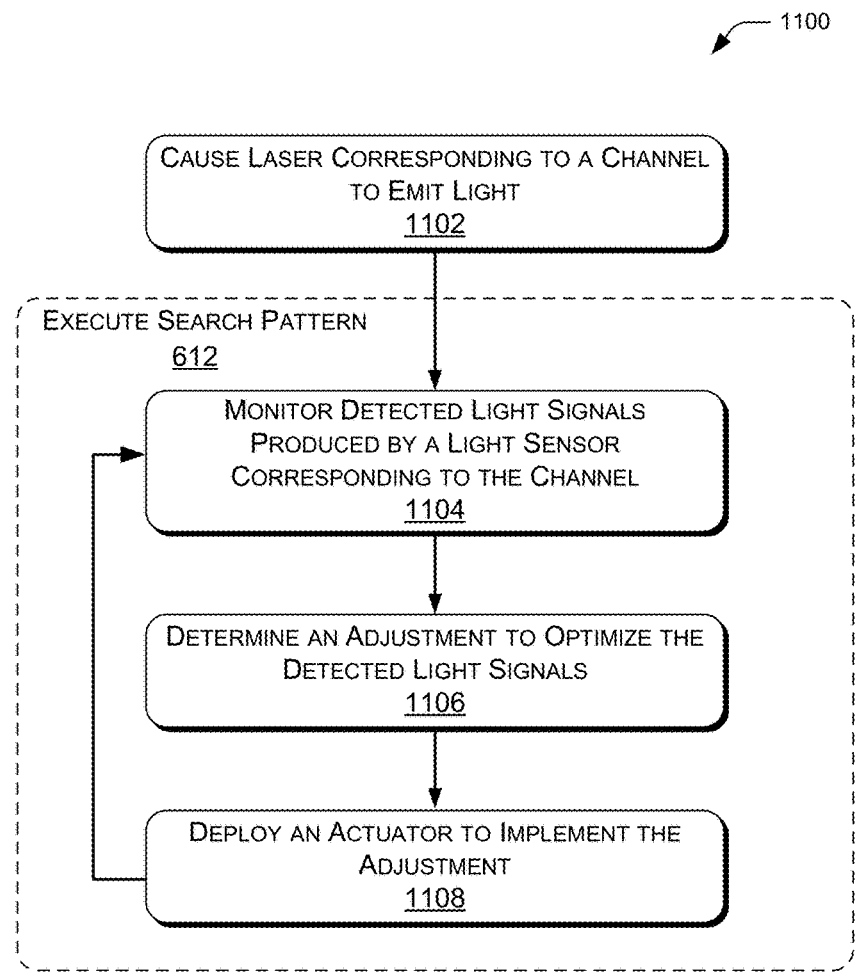
FIG. 11 is a flow diagram of an example process to dynamically align one or more optical components of a LIDAR assembly to calibrate a channel of the LIDAR assembly.

FIG. 11 is a flow diagram of an illustrative process 1100 to dynamically align one or more optical components of a LIDAR assembly to calibrate a channel of the LIDAR assembly.

At block 1102, a laser that corresponds to the channel of the LIDAR assembly being calibrated may be caused to emit pulses of light. For example, the laser may be caused to pulse out a continuous beam of light and/or a series of multiple pulses of light. The pulses of light may then exit the LIDAR assembly and propagate towards an object that ultimately reflects the emitted light back towards the LIDAR assembly.

At block 1104, detected light signals that are produced by a light sensor of the channel in response to the light emitted by the laser may be monitored. For example, a strength of the detected light signals that is indicative of a radiant intensity of the reflected pulses of light reaching the sensor may be monitored.

At block 1106, the detected light signals may be analyzed to determine an adjustment to one or more components of the LIDAR assembly to optimize a characteristic or quality of the detected light signals. For example, in some implementations, the detected light signals may gradually change in a manner indicative of a reflected light path drifting off of the sensor due to the LIDAR system approaching the object as described in relation to FIG. 10B as the object approached the system 1000. Accordingly, an adjustment may be determined in order to counteract the drifting.

At block 1108, the adjustment may be implemented by using actuators to move optical components. For example, actuators may be used to adjust the emission side light path by tilting the light source 904(1) or adjusting the lens 804. In some implementations, the actuator may maintain the optical component in the adjusted position while the LIDAR system remains functional. For example, the LIDAR system may be used to determine a distance to the object and/or a point at which the object is hit by the light (e.g., $P_1$ or $P_2$) based on the detected light signals while the actuator maintains the optical components in an optimal position and/or alignment with respect to other optical components of the LIDAR system.

In some implementations, the strength of the detected signals may be optimized (e.g., maximized or otherwise driven to an optimal level that is not necessarily the maximum achievable) by executing one or more search pattern optimization procedures by iteratively repeating one or more of the operations described in relation to blocks 1104-1108. For example, the process 1000 may include executing the search pattern techniques described in relation to block 612 of FIG. 6.

EXAMPLE CLAUSES

The following nonlimiting examples describe techniques for aligning components of a LIDAR assembly. The examples may be used individually or in any combination.

A. A system for affixing a laser light source to a LIDAR assembly comprises:
a fixture to support the LIDAR assembly with respect to an object;
a manipulator to maintain the laser light source in an alignment relative to a laser support structure of the LIDAR assembly;
one or more processors; and
one or more computer readable storage media storing instructions that are executable by the one or more processors to:
cause the manipulator to move the laser light source adjacent to the laser support structure;
apply a current to the laser light source to emit light toward the object, the object to reflect the light back towards the LIDAR assembly as reflected light;
determine a characteristic of detected light signals that are produced by a light sensor of the LIDAR assembly in response to the reflected light;
determine, based on the characteristic of the detected light signals, an optimal alignment for the laser light source with respect to the light sensor;
cause the manipulator to align the laser light source into the optimal alignment;
couple the laser light source to the laser support structure while the manipulator maintains the laser light source in the optimal alignment; and
cause the manipulator to release the laser light source subsequent to the laser light source being coupled to the laser support structure at the optimal alignment.

B. The system of Example A, wherein the instructions are further executable by the one or more processors to, prior to the laser light source being coupled to the laser support structure:
cause the manipulator to move the laser light source successively through a plurality of alignments with respect to the light sensor;
monitor the characteristic of the detected light signals that correspond to individual ones of the plurality of alignments; and
designate an individual alignment of the plurality of alignments as the optimal alignment.

C. The system of Example A or Example B, wherein the instructions are further executable by the one or more processors to:
cause an adhesive dispenser to apply an adhesive to at least one of the laser light source or the laser support structure; and
cause the manipulator to maintain the laser light source adjacent to the laser support structure in the optimal alignment for an adhesive cure period.

D. The system of Example C, wherein the instructions are further executable by the one or more processors to monitor the characteristic of the detected light signals during the adhesive cure period to maintain the optimal alignment.

E. The system of any one of Examples A-D, wherein the instructions are further executable by the one or more processors to cause a laser driver to transmit an electrical current to the laser light source to generate the light.

F. A method of aligning a laser light source with respect to a light sensor, the method comprising:
causing a manipulator to move the laser light source successively through a plurality of alignments with respect to the light sensor, wherein the light sensor is coupled to a housing;
causing the laser light source to emit light at individual alignments of the plurality of alignments, wherein the light exits the housing toward an object that reflects the light to the light sensor that is coupled to the housing;
monitoring detected light signals produced by the light sensor in response to the light emitted by the laser light source while at the individual alignments;
determining, based on the monitoring the detected light signals, an optimal alignment for the laser light source with respect to the light sensor;
causing the manipulator to maintain the laser light source in the optimal alignment; and
coupling the laser light source to the housing while the manipulator maintains the laser light source at the optimal alignment.

G. The method of Example F, further comprising causing the manipulator to hold the laser light source adjacent and in close proximity to a laser support structure while successively moving the laser light source through the plurality of alignments, wherein the coupling the laser light source to the housing includes coupling the laser light source to the laser support structure.

H. The method of Example F or Example G, wherein the coupling the laser light source to the housing comprises:
applying an adhesive between the laser light source and a laser support structure; and subsequent to the applying the adhesive, causing the manipulator to hold the laser light source at the optimal location for an adhesive cure period to enable the adhesive to secure the laser light source to the laser support structure.

I. The method of Example H, further comprising:
coupling a laser driver to the housing; and
subsequent to adhering the laser light source to the laser support structure, connecting the laser driver to the laser light source to enable the laser driver to cause the laser light source to emit the light.

J. The method of any one of Examples F-I, further comprising applying an electric current to at least one first electrical contact of the manipulator to provide the electric current to at least one second electrical contact of the laser light source.

K. The method of Example J, further comprising causing a clamp of the manipulator to grip the laser light source to selectively mate the at least one first electrical contact and the at least one second electrical contact, wherein the causing the laser light source to emit light includes providing the electric current from the at least one first electrical contact to the at least one second electrical contact.

L. The method of any one of Examples F-K, further comprising determining the plurality of alignments based at least in part on an analysis of the detected light signals with respect to a signal optimization search pattern.

M. The method of any one of Examples F-L, wherein the monitoring the detected light signals includes selecting the light sensor from an array of light sensors based on a determination that the light sensor corresponds to the laser light source, and wherein other light sensors of the array of light sensors correspond to other laser light sources of an array of laser light sources.

N. The method of any one of Examples F-M, wherein the individual alignments are directed toward at least one mirror that is positioned to:
redirect the light through a first lens toward the object; and
redirect reflected light that is reflected by the object through a second lens toward the light sensor.

O. A system for aligning light sensors within a LIDAR assembly, the system comprising:
a fixture to support the LIDAR assembly with respect to a surface to enable at least one laser light source of the LIDAR assembly to emit light toward the surface;
a first light sensor to produce detected light signals in response to receiving reflected light that is reflected by the surface back toward the LIDAR assembly;
a manipulator to install a second light sensor at an optimal location of a sensor board, wherein the sensor board is configured to secure the second light sensor within the LIDAR assembly upon the sensor board being installed into the LIDAR assembly;
one or more processors; and
one or more computer readable storage media storing instructions that are executable by the one or more processors to:
determine, based on the detected light signals, a region of the first light sensor having received the reflected light;
determine the optimal location of the sensor board at which to install the second light sensor based at least in part on the region of the first light sensor;
cause the manipulator to align the second light sensor at the optimal location of the sensor board; and
cause the manipulator to release the second light sensor subsequent to the second light sensor being coupled to the sensor board at the optimal location.

P. The system of Example O, wherein the instructions are further executable by the one or more processors to map a location of the region of the first light sensor to a location of the sensor board.

Q. The system of Example O or Example P, wherein the sensor board is configured support a sensor array comprising a plurality of individual light sensors, the plurality of individual light sensors including the second light sensor, and wherein an aggregated photo-sensitive area corresponding to the plurality of individual light sensors is smaller than a photo-sensitive area corresponding to the first light sensor.

R. The system of any one of Examples O-Q, wherein the detected light signals correspond to a plurality of laser light sources that are caused to successively emit the light according to an emission pattern, and wherein the instructions are further executable by the one or more processors to:
determine, based on the detected light signals, a plurality of regions of the first light sensor having received the reflected light, wherein individual regions of the plurality of regions correspond to individual laser light sources of the plurality of laser light sources; and
map the individual regions to the individual laser light sources based on the detected light signals and the emission pattern.

S. A method for aligning one or more light sensors within a LIDAR assembly, the method comprising:
coupling at least one laser light source to a housing of the LIDAR assembly at an alignment to direct light emitted by the at least one laser light source toward a surface that is remote from the LIDAR assembly;
positioning a first light sensor within the LIDAR assembly;
causing the at least one laser light source to emit the light toward the surface while the first light sensor is positioned within the LIDAR assembly to generate reflected light that is reflected by the surface;
monitoring detected light signals produced by the first light sensor to determine at least one region of the first light sensor that receives the reflected light;
determining, based on the at least one region of the first light sensor, at least one optimal alignment within the LIDAR assembly to position at least one second light sensor with respect to the at least one laser light source; and
subsequent to removing the first light sensor from the LIDAR assembly, coupling the at least one second light sensor to the housing at the at least one optimal alignment.

T. The method of Example S, further comprising customizing a sensor board by positioning the at least one second light sensor on the sensor board based on the at least one region to generate a customized sensor board, wherein the coupling the at least one second light sensor to the housing at the at least one optimal alignment includes coupling the customized sensor board to the housing.

U. The method of Example S or Example T, wherein the positioning the first light sensor within the LIDAR assembly includes mating the first light sensor to a mounting pattern of the LIDAR assembly, and wherein the coupling the customized sensor board to the housing includes coupling the sensor board to the mounting pattern.

V. The method of any one of Examples S-U, wherein the at least one region of the first light sensor includes a plurality of regions and the at least one laser light source includes a plurality of laser light sources, and wherein individual regions of the plurality of regions corresponds to individual laser light sources of the plurality of laser light sources.

W. The method of any one of Examples S-V, wherein the at least one second light sensor includes a plurality of second light sensors, and wherein a first light-sensing-area of the first light sensor is greater than a sum of a plurality of second light-sensing-areas that correspond to the plurality of second light sensors.

X. The method of any one of Examples S-W, wherein the coupling the at least one laser light source to the housing includes coupling at least one laser support structure to the housing, the at least one laser light source being at least one of (i) coupled to the at least one laser support structure or (ii) integrated into the at least one laser support structure.

Y. A system comprising:
a laser light source to emit light from a housing toward a surface that reflects the light towards the housing as reflected light;
a light sensor to produce detected light signals in response to receiving at least a portion of the reflected light;
one or more optical elements disposed in an optical path between the laser light source and the light sensor;
an actuator coupled to the one or more optical elements to control a direction that the reflected light travels toward the light sensor;
one or more processors; and
one or more computer readable storage media storing instructions that are executable by the one or more processors to:
monitor the detected light signals produced by the light sensor in response to the at least the portion of the reflected light; and
determine, based on the detected light signals, an adjustment to the one more optical elements to optimize at least one characteristic of the detected light signals; and
cause the actuator to move the one or more optical elements to implement the adjustment.

Z. The system of Example Y, wherein the one or more optical elements comprise at least one lens, and moving the one or more optical elements comprises tilting or translating the at least one lens.

AA. The system of Example Y or Example Z, wherein determining the adjustment to the direction of the light to optimize the at least one characteristic of the detected light signals comprises:
causing the actuator to successively move the one or more optical elements of the system through a plurality of adjustments; and
monitoring the detected signals while the one or more optical elements of the system are moved through the plurality of adjustments; and
selecting an optimal adjustment from among the plurality of adjustments based at least in part on the detected signals.

BB. The system of Example AA, wherein the optimal adjustment corresponds to an adjustment that at least one of:
maximizes the intensity of the detected signals;
minimizes parallax; or maximizes the signal to noise ratio of the detected signals.

CC. A system comprising:
a laser light source to emit light from a housing toward a surface that reflects the light towards the housing as reflected light;
a light sensor to produce detected light signals in response to receiving at least a portion of the reflected light;
one or more processors; and
one or more computer readable storage media storing instructions that are executable by the one or more processors to:
monitor the detected light signals produced by the light sensor in response to the at least the portion of the reflected light; and
determine, based on the detected light signals, an adjustment to the direction of the light to optimize at least one characteristic of the detected light signals; and
cause at least one actuator to move one or more components of the system to implement the adjustment.

DD. The system of Example CC, further comprising the at least one actuator, wherein the at least one actuator is configured to actuate one or more optical components to control a direction that the light travels toward the surface, wherein the detected light signals vary based on the direction of the light.

EE. The system of Example CC or Example DD, wherein the at least one actuator is configured to move at least one lens to control a direction that the reflected light travels toward the light sensor.

FF. The system of any one of Examples CC-EE, wherein the at least one actuator is configured to move the laser light source to control a direction that the light travels toward the surface.

GG. The system of any one of Examples CC-FF, wherein the at least one actuator is configured to move the light sensor.

HH. The system of any one of Examples CC-FF, wherein the instructions are further executable by the one or more processors to determine a distance from the system to the surface based on the detected light signals while the at least one actuator maintains the one or more components of the system in an optimal position achieved by implementing the adjustment.

II. The system of any one of Examples CC-HH, wherein the laser light source includes a plurality of laser light sources, and wherein the light sensor includes a plurality of light sensing elements, individual laser light sources of the plurality of laser light sources corresponding to individual light sensors of the plurality of light sensors.

JJ. The system of any one of Examples CC-II, wherein the at least one characteristic includes an intensity of the detected light signals that is based at least partially on the direction of the light, wherein the instructions are further executable by the one or more processors to:
determine a plurality of adjustments based on a plurality of changes to the intensity of the detected signals; and
cause the at least one actuator to successively move the one or more components of the system through the plurality of adjustments to determine an optimal adjustment.

KK. The system of Example JJ, wherein the optimal adjustment corresponds to maximizing the intensity of the detected signals.

LL. The system of any one of Examples CC-II, wherein the at least one characteristic includes parallax, and optimization of the characteristic includes minimizing the parallax.

MM. The system of any one of Examples CC-II, wherein the at least one characteristic includes signal-to-noise ratio (SNR), and optimization of the characteristic includes maximizing the SNR.

NN. The system of any one of Examples CC-MM, wherein the at least one actuator releases the one or more components of the system from the adjustment based on the system being powered down, and wherein the instructions are further executable by the one or more processors to re-implement the adjustment based on the system being powered up.

OO. The system of any one of Examples CC-NN, wherein the at least one actuator maintains the one or more components of the system in the adjusted condition when the system is powered down.

PP. The system of any one of Examples CC-OO, wherein the at least one actuator comprises at least one of a piezo electric actuator, a Tunable Acoustic Gradient (TAG) index of refraction lens, or a liquid lens.

QQ. The system of any one of Examples CC-PP, wherein the at least one characteristic is an intensity of the detected light signals that is based at least partially on the direction of the light, wherein the instructions are further executable by the one or more processors to:
  monitor the detected light signals to identify a reduction to the intensity that is based on a proximity of the surface to the system; and
  cause the at least one actuator to move the one or more components of the system in response to the reduction to the intensity of the detected signals.

RR. A method of calibrating a LIDAR assembly, the method comprising:
  causing a laser to emit light along an optical path toward a surface that reflects the light back to the LIDAR assembly as reflected light;
  monitoring detected light signals produced in response to at least a portion of the reflected light received by a light sensor;
  determining, based at least in part on the detected light signals, an adjustment to one or more components of the LIDAR assembly to optimize at least one characteristic of the detected light signals; and
  implementing the adjustment to the one or more components of the LIDAR assembly by causing at least one actuator to move the one or more components to control at least a portion of the optical path.

SS. The method of Example RR, wherein the causing the at least one actuator to move the one or more components comprises causing the at least one actuator to tilt or displace at least one of:
  the laser;
  a lens; or
  the light sensor.

TT. The method of Example RR or Example SS, wherein the causing the at least one actuator to move the one or more components is performed during operation of the LIDAR assembly.

CONCLUSION

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for affixing a laser light source to a LIDAR assembly, the system comprising:
  a fixture to support the LIDAR assembly with respect to an object;
  a manipulator to maintain the laser light source in an alignment relative to a laser support structure of the LIDAR assembly;
  one or more processors; and
  one or more computer readable storage media storing instructions that are executable by the one or more processors to:
    cause the manipulator to move the laser light source adjacent to the laser support structure;
    apply a current to the laser light source to emit light toward the object, the object to reflect the light back towards the LIDAR assembly as reflected light;
    determine a characteristic of detected light signals that are produced by a light sensor of the LIDAR assembly in response to the reflected light;
    determine, based on the characteristic of the detected light signals, an optimal alignment for the laser light source with respect to the light sensor by:
      causing the manipulator to move the laser light source successively through a plurality of alignments with respect to the light sensor;
      monitoring the characteristic of the detected light signals that correspond to individual ones of the plurality of alignments; and
      designating an individual alignment of the plurality of alignments as the optimal alignment;
    cause the manipulator to align the laser light source into the optimal alignment;
    couple the laser light source to the laser support structure while the manipulator maintains the laser light source in the optimal alignment; and
    cause the manipulator to release the laser light source subsequent to the laser light source being coupled to the laser support structure at the optimal alignment.

2. The system of claim 1, wherein the instructions are further executable by the one or more processors to:
  cause an adhesive dispenser to apply an adhesive to at least one of the laser light source or the laser support structure; and
  cause the manipulator to maintain the laser light source adjacent to the laser support structure in the optimal alignment for an adhesive cure period.

3. The system of claim 1, wherein the instructions are further executable by the one or more processors to cause a laser driver to transmit an electrical current to the laser light source to generate the light.

4. A method of aligning a laser light source with respect to a light sensor, the method comprising:
  causing a manipulator to move the laser light source successively through a plurality of alignments with respect to the light sensor, wherein the light sensor is coupled to a housing;
  applying an electric current to at least one first electrical contact of the manipulator to provide the electric current to at least one second electrical contact of the laser light source;
  causing the laser light source to emit light at individual alignments of the plurality of alignments, wherein the light exits the housing toward an object that reflects the light to the light sensor that is coupled to the housing;
  monitoring detected light signals produced by the light sensor in response to the light emitted by the laser light source while at the individual alignments;
  determining, based on the monitoring the detected light signals, an optimal alignment for the laser light source with respect to the light sensor;

causing the manipulator to maintain the laser light source in the optimal alignment; and coupling the laser light source to the housing while the manipulator maintains the laser light source at the optimal alignment.

5. The method of claim 4, wherein the coupling the laser light source to the housing includes coupling the laser light source to a laser support structure.

6. The method of claim 4, wherein the coupling the laser light source to the housing comprises:

applying an adhesive between the laser light source and a laser support structure; and subsequent to the applying the adhesive, causing the manipulator to hold the laser light source at the optimal location for an adhesive cure period to enable the adhesive to secure the laser light source to the laser support structure.

7. The method of claim 6, further comprising:

coupling a laser driver to the housing; and subsequent to adhering the laser light source to the laser support structure, connecting the laser driver to the laser light source to enable the laser driver to cause the laser light source to emit the light.

8. The method of claim 4, further comprising causing a clamp of the manipulator to grip the laser light source to selectively mate the at least one first electrical contact and the at least one second electrical contact, wherein the causing the laser light source to emit light includes providing the electric current from the at least one first electrical contact to the at least one second electrical contact.

9. The method of claim 4, wherein the monitoring the detected light signals includes selecting the light sensor from an array of light sensors based on a determination that the light sensor corresponds to the laser light source, and wherein other light sensors of the array of light sensors correspond to other laser light sources of an array of laser light sources.

10. The method of claim 4, wherein the individual alignments are directed toward at least one mirror that is positioned to:

redirect the light through a first lens toward the object; and redirect reflected light that is reflected by the object through a second lens toward the light sensor.

11. The method of claim 4, wherein the optimal alignment is determined based at least in part on at least one of a quality or an intensity of the detected light signal.

12. The method of claim 4, wherein causing the manipulator to move the laser light source successively through the plurality of alignments is performed until a quality of the detected light signal ceases to improve or the quality of the signal reaches a predetermined signal quality.

13. The method of claim 4, further comprising installing additional optical components into the LIDAR assembly prior to causing the laser light source to emit the light.

14. A system for aligning light sensors within a LIDAR assembly, the system comprising:

a fixture to support the LIDAR assembly with respect to a surface to enable at least one laser light source of the LIDAR assembly to emit light toward the surface;

a first light sensor to produce detected light signals in response to receiving reflected light that is reflected by the surface back toward the LIDAR assembly;

a manipulator to install a second light sensor at an optimal location of a sensor board, wherein the sensor board is configured to secure the second light sensor within the LIDAR assembly upon the sensor board being installed into the LIDAR assembly;

one or more processors; and one or more computer readable storage media storing instructions that are executable by the one or more processors to:

determine, based on the detected light signals, a region of the first light sensor having received the reflected light;

map a location of the region of the first light sensor to a location of the sensor board;

determine the optimal location of the sensor board at which to install the second light sensor based at least in part on the region of the first light sensor;

cause the manipulator to align the second light sensor at the optimal location of the sensor board; and cause the manipulator to release the second light sensor subsequent to the second light sensor being coupled to the sensor board at the optimal location.

15. The system of claim 14, wherein the sensor board is configured support a sensor array comprising a plurality of individual light sensors, the plurality of individual light sensors including the second light sensor, and wherein an aggregated photo-sensitive area corresponding to the plurality of individual light sensors is smaller than a photo-sensitive area corresponding to the first light sensor.

16. The system of claim 14, wherein the detected light signals correspond to a plurality of laser light sources that are caused to successively emit the light according to an emission pattern, and wherein the instructions are further executable by the one or more processors to:

determine, based on the detected light signals, a plurality of regions of the first light sensor having received the reflected light, wherein individual regions of the plurality of regions correspond to individual laser light sources of the plurality of laser light sources; and map the individual regions to the individual laser light sources based on the detected light signals and the emission pattern.

17. The system of claim 14, wherein causing the manipulator to align the second light sensor at the optimal location of the sensor board is based on a known relationship between a location of the light sensor and a location of the sensor board.

18. A method for aligning one or more light sensors within a LIDAR assembly, the method comprising:

coupling at least one laser light source to a housing of the LIDAR assembly at an alignment to direct light emitted by the at least one laser light source toward a surface that is remote from the LIDAR assembly;

positioning a first light sensor within the LIDAR assembly by mating the first light sensor to a mounting structure of the LIDAR assembly;

causing the at least one laser light source to emit the light toward the surface while the first light sensor is positioned within the LIDAR assembly to generate reflected light that is reflected by the surface;

monitoring detected light signals produced by the first light sensor to determine at least one region of the first light sensor that receives the reflected light;

determining, based on the at least one region of the first light sensor, at least one optimal alignment within the LIDAR assembly to position at least one second light sensor with respect to the at least one laser light source;

customizing a sensor board by positioning the at least one second light sensor on the sensor board based on the at least one region to generate a customized sensor board; and subsequent to removing the first light sensor from the LIDAR assembly, coupling the at least one second light sensor to the housing at the at least one optimal alignment, wherein coupling the at least one second light sensor to the housing includes coupling the customized sensor board to the mounting structure.

19. The method of claim 18, wherein the at least one region of the first light sensor includes a plurality of regions and the at least one laser light source includes a plurality of laser light sources, and wherein individual regions of the plurality of regions corresponds to individual laser light sources of the plurality of laser light sources.

20. The method of claim 18, wherein the at least one region of the first light sensor that receives the reflected light is determined by an intensity of the reflected light and a location of the first light sensor that receives the reflected light.

\* \* \* \* \*